(12) United States Patent
Lee et al.

(10) Patent No.: US 12,333,152 B2
(45) Date of Patent: Jun. 17, 2025

(54) STORAGE DEVICE

(71) Applicant: SAMSUNG ELECTRONICS CO., LTD., Suwon-si (KR)

(72) Inventors: Kyungduk Lee, Seongnam-si (KR); Youngseop Shim, Seoul (KR); Jongsung Na, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 106 days.

(21) Appl. No.: 17/990,789

(22) Filed: Nov. 21, 2022

(65) Prior Publication Data

US 2023/0195324 A1 Jun. 22, 2023

(30) Foreign Application Priority Data

Dec. 20, 2021 (KR) .......................... 10-2021-0182376
May 9, 2022 (KR) .......................... 10-2022-0056696

(51) Int. Cl.
*G06F 3/06* (2006.01)

(52) U.S. Cl.
CPC ............ *G06F 3/0619* (2013.01); *G06F 3/064* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 7,679,133 B2 | 3/2010 | Son et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 9,465,537 B2 | 10/2016 | Nishikubo et al. | |
| 9,921,956 B2 | 3/2018 | Thomas et al. | |
| 9,996,477 B2 | 6/2018 | Chan et al. | |
| 2011/0233648 A1 | 9/2011 | Seol et al. | |
| 2015/0220394 A1* | 8/2015 | Tanaka | G06F 11/1048 714/764 |
| 2016/0110114 A1* | 4/2016 | Moon | G06F 12/0246 711/103 |

(Continued)

FOREIGN PATENT DOCUMENTS

| | | |
|---|---|---|
| KR | 10-2014-0101690 | 8/2014 |
| KR | 10-2021-0083081 | 7/2021 |

*Primary Examiner* — Stephanie Wu
(74) *Attorney, Agent, or Firm* — MORGAN, LEWIS & BOCKIUS LLP

(57) ABSTRACT

A storage device including: a memory device including a plurality of superblocks, wherein each superblock includes memory blocks included in a group of a plurality of non-volatile memories; and a controller for controlling the memory device, wherein the controller controls a first superblock among the plurality of superblocks to be erased to program data received from a host, controls the data to be programmed in the first superblock, controls the first superblock to be selected as a victim superblock for a garbage collection operation, and controls a media scanning operation to be performed on the memory device when a data duration is greater than a threshold, wherein the data duration is an interval between a first time point, at which the first superblock is erased, and a second time point, at which the first superblock is selected as the victim superblock.

21 Claims, 18 Drawing Sheets

(56) References Cited

U.S. PATENT DOCUMENTS

| | | |
|---|---|---|
| 2016/0366180 A1 | 12/2016 | Smith et al. |
| 2019/0294539 A1* | 9/2019 | Matsudaira ........... G06F 3/0679 |
| 2024/0094955 A1* | 3/2024 | Matsukawa ........... G06F 3/0659 |

* cited by examiner

STORAGE DEVICE

CROSS-REFERENCE TO RELATED APPLICATION(S)

This application claims priority under 35 U.S.C. § 119(a) to Korean Patent Application No. 10-2021-0182376 filed on Dec. 20, 2021 and Korean Patent Application No. 10-2022-0056696 filed on May 9, 2022 in the Korean Intellectual Property Office, the disclosures of which are incorporated by reference herein in their entireties.

TECHNICAL FIELD

The present inventive concept relates to a storage device including a non-volatile memory.

DISCUSSION OF RELATED ART

A semiconductor memory may be classified as a volatile memory device or a non-volatile memory device. The volatile memory device may lose stored data in the absence of power, whereas the non-volatile memory device may retain stored data even when power is not provided. The non-volatile memory may include a read only memory (ROM), a programmable ROM (PROM), an electrically programmable ROM (EPROM), an electrically erasable and programmable ROM (EEPROM), a flash memory, a phase-change random access memory (PRAM), a magnetic RAM (MRAM), a resistive RAM (RRAM), a ferroelectric RAM (FRAM) or the like.

As time elapses after data is programmed into memory cells of the non-volatile memory, a threshold voltage distribution of the memory cells may be deteriorated, and thus, data read from the memory cells may have lower reliability. To maintain the reliability of the read data, the storage device may drive defense logic on the non-volatile memory. However, when the defense logic is driven too frequently, the performance of the storage device and the reliability of the read data may be reduced.

SUMMARY

Example embodiments of the present inventive concept provide a storage device that increases reliability of data read from a non-volatile memory by controlling performance of defense logic on the non-volatile memory while minimizing lower performance of the storage device.

Example embodiments of the present inventive concept provide a storage device that controls performance of defense logic by using a telemetry log of a non-volatile memory.

According to example embodiments of the present inventive concept, there is provided a storage device including: a memory device including a plurality of superblocks, wherein each superblock includes memory blocks included in a group of a plurality of non-volatile memories; and a controller for controlling the memory device, wherein the controller controls a first superblock among the plurality of superblocks to be erased to program data received from a host, controls the data to be programmed in the first superblock, controls the first superblock to be selected as a victim superblock for a garbage collection operation, and controls a media scanning operation to be performed on the memory device when a data duration is greater than a threshold, wherein the data duration is an interval between a first time point, at which the first superblock is erased, and a second time point, at which the first superblock is selected as the victim superblock.

According to example embodiments of the present inventive concept, there is provided a storage device including: a memory device including a plurality of non-volatile memories and a plurality of superblocks, wherein each superblock includes memory blocks included in a group of the plurality of non-volatile memories; and a controller for controlling the memory device, wherein the controller controls a superblock selected from the plurality of superblocks to be erased to program data received from a host, controls the data to be programmed in the erased superblock, and controls the superblock in which the data is programmed to be selected as a victim superblock for a garbage collection operation, controls a telemetry log including statistical information about a data duration of the plurality of superblocks to be updated based on information about a data duration of a first superblock of the plurality of superblocks, wherein the data duration of the first superblock is an interval between a first time point at which the first superblock is erased, and a second time point, at which the first superblock is determined as the victim superblock, in one power-on period, and controls a threshold of the data duration of the plurality of superblocks for triggering a media scanning operation on the memory device to be adjusted based on the telemetry log.

According to example embodiments of the present inventive concept, there is provided a storage device including: a memory device including a plurality of memory blocks; and a controller for controlling the memory device, wherein the controller controls a media scanning operation on the memory device to be performed when a certain memory block among the plurality of memory blocks is erased and a data duration, which corresponds to a time until data is invalidated after the data is programmed into the memory block, is greater than a threshold, wherein the controller controls statistical information about the data duration of the plurality of memory blocks to be generated, and wherein the controller controls a criterion for triggering the media scanning operation to be adjusted based on the statistical information.

BRIEF DESCRIPTION OF THE DRAWINGS

The above and other features of the present inventive concept will be more clearly understood from the following detailed description, taken in conjunction with the accompanying drawings, in which.

DETAILED DESCRIPTION OF THE EMBODIMENTS

Hereinafter, example embodiments of the present inventive concept will be described with reference to the accompanying drawings.

Figure 1:
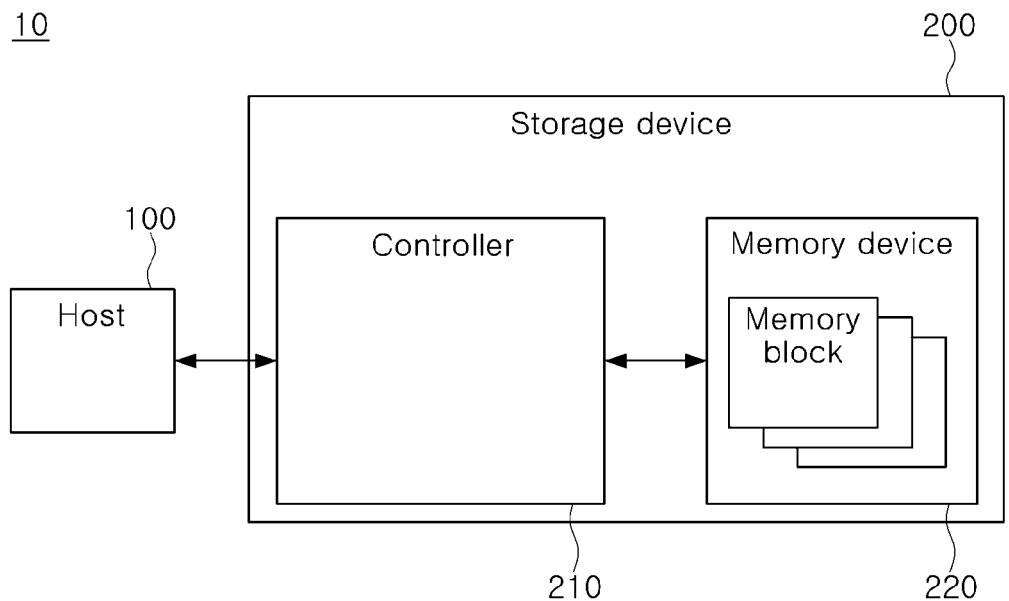
FIG. 1 is a diagram showing a host-storage system including a storage device according to example embodiments of the present inventive concept.

FIG. 1 is a diagram showing a host-storage system including a storage device according to example embodiments of the present inventive concept.

A host-storage system 10 may include a host 100 and a storage device 200. In addition, the storage device 200 may include a controller 210 and a memory device 220.

The host 100 may be an electronic device, for example, a portable electronic device such as a mobile phone, a moving picture experts group (MPEG) audio layer-3 (MP3) player or a laptop computer, or an electronic device such as a desktop computer, a game console, a television (TV) or a projector. The host 100 may include at least one operating system (OS). The operating system may manage and control overall functions and operations of the host 100.

The storage device 200 may include storage media for storing data, based on a request from the host 100. For example, the storage device 200 may include at least one of a solid state drive (SSD), an embedded memory and a removable external memory. When the storage device 200 is the SSD, the storage device 200 may be a device complying with a non-volatile memory express (NVMe) standard. When the storage device 200 is the embedded memory or the external memory, the storage device 200 may be a device complying with a universal flash storage (UFS) standard or an embedded multi-media card (eMMC) standard. Each of the host 100 and the storage device 200 may generate and transmit a packet based on an adopted standard protocol.

The memory device 220 may maintain stored data when power is not supplied thereto. In other words, the memory device 220 may be a non-volatile memory. The memory device 220 may store data provided from the host 100 through a write operation, and may output data stored in the memory device 220 through a read operation. The memory device 220 may include a plurality of memory blocks including memory cells.

When the memory device 220 includes a flash memory, the flash memory may include a two-dimensional (2D) NAND memory array or a three-dimensional (3D)/vertical NAND (VNAND) memory array. Additionally, the storage device 200 may include various other types of non-volatile memories. For example, the storage device 200 may include a magnetic random access memory (MRAM), a spin-transfer torque MRAM, a conductive bridging RAM (CBRAM), a ferroelectric RAM (FeRAM), a phase-change RAM (PRAM), a resistive RAM or various other types of memories.

The controller 210 may control the memory device 220 in response to a request from the host 100. For example, the controller 210 may allow the host 100 to be provided with data read from the memory device 220, and the data provided from the host 100 to be stored in the memory device 220. In other words, the controller 210 may control an operation of reading, programming, erasing or the like, performed on the memory device 220.

The controller 210 may allow defense logic on the memory device 220 to be driven as well as control the operations of reading, programming or erasing. For example, when a long time elapses after data is programmed into the memory cells of the memory device 220, a threshold voltage distribution of the memory cells may be deteriorated, thus lowering reliability of data read from the memory cells. Accordingly, the controller 210 may allow a media scanning operation to be periodically performed to maintain the reliability of data read from the memory cells. For example, the media scanning operation may be an operation in which the controller 210 allows data to be read from an arbitrary page or a predetermined page in a memory block even without a request from the host 100, and allows the data stored in the memory block to be written to another memory block when the number of error bits in the read data is greater than a threshold. For example, the media scanning operation may be a patrol read operation for reading pages of the memory blocks, based on a physical address of the memory device 220, a background media scan (BMS) operation for reading pages of the memory blocks, based on a logical address of the memory device 220, etc.

Data stored in the storage device 200 may be frequently updated when a workload of the host 100 is centered on hot data. Whenever the data stored in the storage device 200 is updated, existing data programmed in the memory cells may be invalidated and the updated data may be programmed into other memory cells. Accordingly, when the workload of the host 100 is centered on hot data, the threshold voltage distribution of the memory cells may not be significantly deteriorated, thus maintaining the reliability of the data read from the memory cells.

Additionally, the media scanning operation may accompany a read operation of a memory block. Accordingly, the media scanning operation may cause a delay in a data input/output operation of the storage device 200 and may cause a read disturbance. In this case, the media scanning operation may lower the performance and reliability of the storage device 200, if the storage device 200 performs the media scanning operation to maintain the reliability of the data read from the memory cells.

According to example embodiments of the present inventive concept, the storage device 200 may control the media scanning operation, based on a data duration which is a time it takes after data is programmed in the memory cells to be invalidated. For example, the controller 210 may determine the data duration, based on a time point at which the memory block is erased to program data into the memory block and a time point at which all the data programmed in the memory block are invalidated. In other words, the controller 210 may determine the data duration based on an erase time point and program completion time point. In addition, the controller 210 may allow the media scanning operation on the memory device 220 to be performed when the data duration of the memory block is greater than a threshold, and to skip the media scanning operation when the data duration of the memory block is not greater than the threshold.

In addition, the controller 210 may control management of statistical information about the data duration of the memory blocks in a telemetry log, and control a threshold for triggering the media scanning operation, based on the statistical information. For example, when detecting a tendency in which the data duration becomes shorter, based on the statistical information, the controller 210 may allow the threshold to be increased so that the media scanning operation is triggered less frequently.

According to example embodiments of the present inventive concept, the storage device 200 may have optimized performance and reliability by performing no media scanning operation by maintaining the reliability of the data read from the memory device 220 only through the input/output operation with the host 100.

Figure 2:
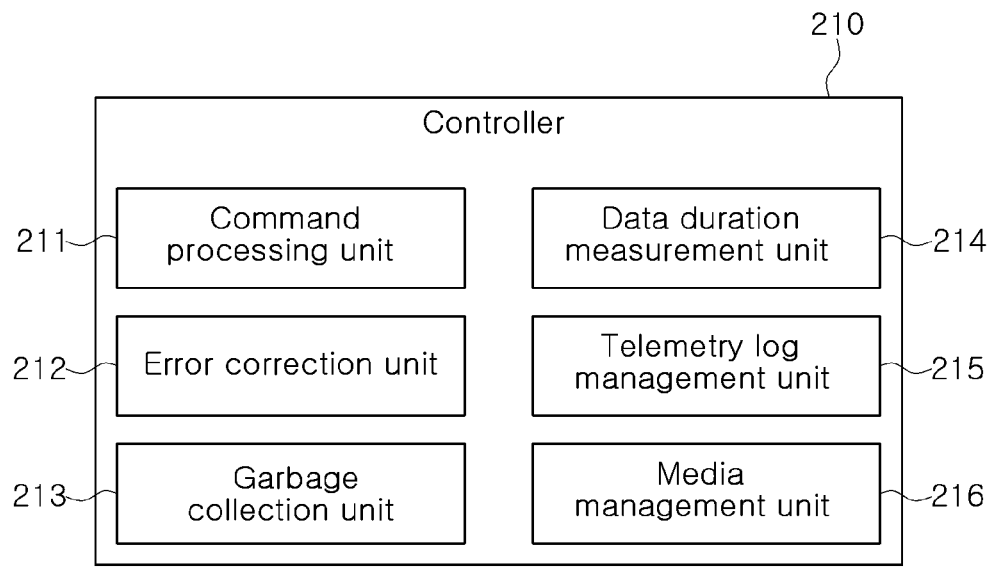
FIG. 2 is a diagram specifically illustrating a controller included in the storage device of FIG. 1.

FIG. 2 is a diagram specifically illustrating a controller included in the storage device of FIG. 1.

The controller 210 may include a command processing unit 211, an error correction unit 212, a garbage collection unit 213, a data duration measurement unit 214, a telemetry log management unit 215 and a media management unit 216.

The command processing unit 211 may control the read operation or write operation of the memory device 220 in response to a read command or a write command received from the host 100. For example, the command processing unit 211 may convert the logical address received from the host 100 along with the read command or the write command to the physical address used in the memory device 220, and may control the read operation or the write operation performed on a memory region indicated by the physical address.

The error correction unit 212 may detect and correct an error in the data read from the memory device 220. For example, the error correction unit 212 may add parity to the data by performing error correction encoding on data to be programmed into the memory device 220. In addition, the error correction unit 212 may detect and correct the error in the read data by performing error correction decoding by using the parity included in the data read from the memory device 220.

The garbage collection unit 213 may perform a garbage collection operation to secure a free space of the memory device 220. For example, to overcome a limitation of the memory device 220 not supporting an overwrite operation, the controller 210 may allow previously programmed data to be invalidated to update the data programmed in the memory device 220, and allow the updated data to be programmed into another memory region. A size of the free space where valid data may be programmed may be reduced when an amount of the invalidated data in the memory device 220 is increased. Accordingly, the garbage collection unit 213 may secure the free space by collecting the valid data scattered in victim memory blocks of the memory device 220, program-ming the same in another memory block, and erasing the programmed data in the victim memory blocks.

To control the media scanning operation, the data duration measurement unit 214 may determine a time until the programmed data is invalidated from when the memory block of the memory device 220 is erased for the write operation, and the data is then programmed into the memory block. The data duration may be determined for each memory block or for each superblock which is a set of memory blocks. The superblock is described below with reference to FIG. 3, and a method of determining the data duration is described with reference to FIG. 9.

The telemetry log management unit 215 may collect the telemetry log of the storage device 200. The telemetry log may include health monitoring information, performance information or the like of the storage device 200. The telemetry log may be externally output from the storage device 200, and may be obtained by a manufacturer of the storage device 200. The telemetry log may be used to increase the functionality and reliability of the storage device 200.

According to example embodiments of the present inventive concept, the telemetry log management unit 215 may manage the statistical information on or about the data duration. The controller 210 may allow the statistical information to be externally output from the storage device 200 and may use the statistical information to adjust the threshold for triggering the media scanning operation.

The media management unit 216 may drive the defense logic for maintaining the reliability of the data stored in the memory device 220. According to example embodiments of the present inventive concept, the media management unit 216 may perform the media scanning operation when the data duration of the storage device 220 is greater than the threshold.

The command processing unit 211, the error correction unit 212, the garbage collection unit 213, the data duration measurement unit 214, the telemetry log management unit 215 and the media management unit 216 may be loaded into a memory included in the controller 210, and implemented as firmware driven by a processor included in the controller 210. However, the present inventive concept is not limited thereto. For example, the error correction unit 212 may include an error correction code circuit for performing the error correction encoding and decoding.

Figure 3:
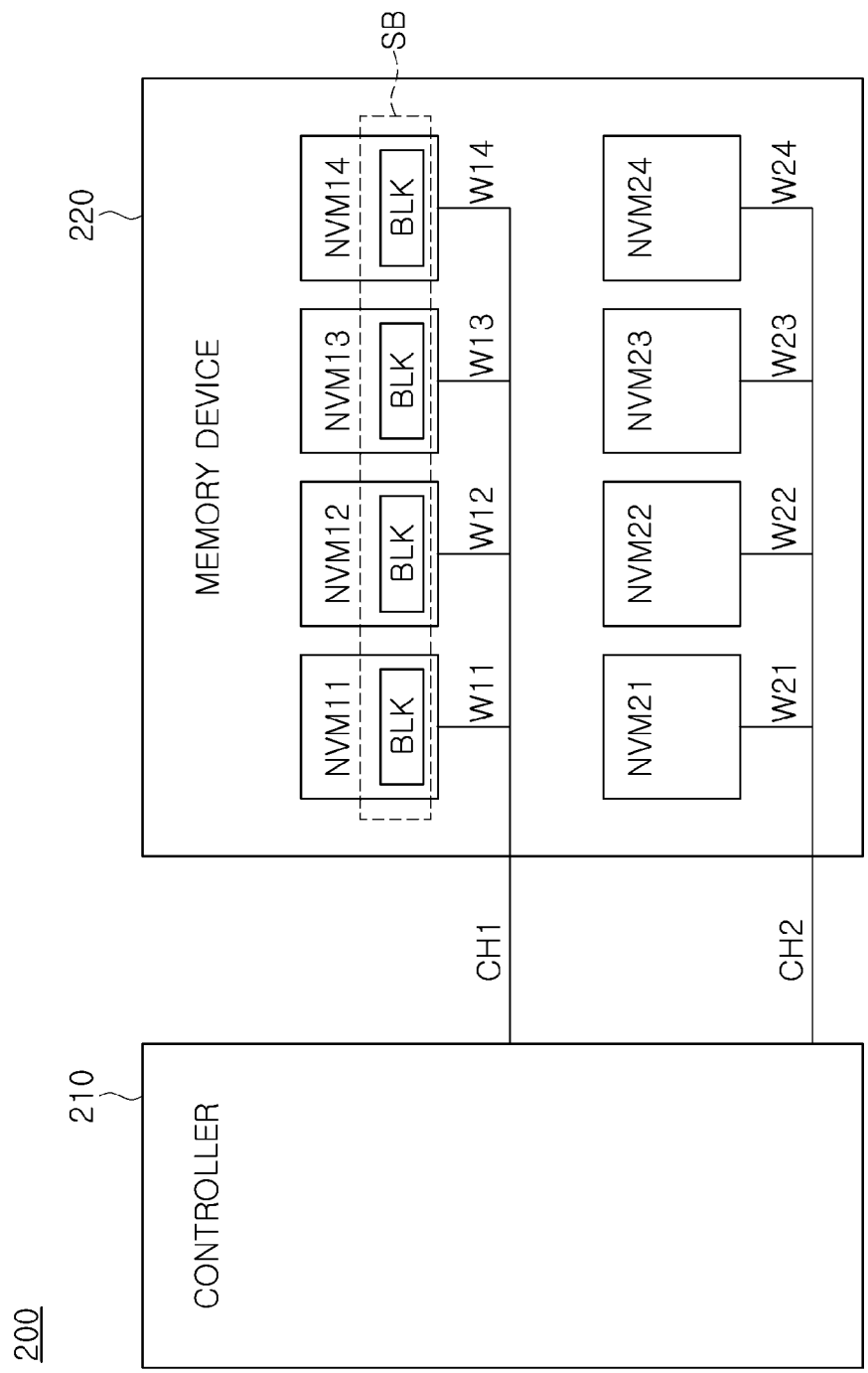
FIG. 3 is a view specifically illustrating the storage device of FIG. 1.

FIG. 3 is a view specifically illustrating the storage device of FIG. 1.

As described with reference to FIG. 1, the storage device 200 may include the controller 210 and the memory device 220. The memory device 220 may include a plurality of non-volatile memories NVM11, NVM12, NVM13, NVM14, NVM21, NVM22, NVM23 and NVM24. Each of the non-volatile memory memories NVM11 to NVM24 may be connected to one of a plurality of channels CH1 and CH2. For example, the non-volatile memories NVM11 to NVM14 may be connected to the first channel CH1 through ways W11, W12, W13 and W14, and the non-volatile memories NVM21 to NVM24 may be connected to the second channel CH2 through ways W21, W22, W23 and W24.

In example embodiments, each of the non-volatile memories NVM11 to NVM24 may be implemented in any unit of memory which may be operated by an individual command received from the controller 210. For example, each of the non-volatile memories NVM11 to NVM24 may be implemented as a chip or a die, and the present inventive concept is not limited thereto. In addition, the number of the channels included in the storage device 200 and the number of the non-volatile memories connected to each channel are not limited either.

The controller 210 may allow signals to be transmitted to and received from the memory device 220 through the plurality of channels CH1 and CH2. For example, the controller 210 may allow commands, addresses and data to be transmitted to the memory device 220 or allow data to be received from the memory device 220, through the channels CH1 and CH2.

The controller 210 may allow one of the non-volatile memories NVM11 to NVM24 connected to the corresponding channel to be selected through each channel, and allow the signals to be transmitted to and received from the selected non-volatile memory. For example, the controller 210 may allow the non-volatile memory NVM11 to be selected from the non-volatile memories NVM11 to NVM14 connected to the first channel CH1. The controller 210 may allow the command, the address and data to be transmitted to the selected non-volatile memory NVM11 or allow data to be received from the selected non-volatile memory NVM11, through the first channel CH1.

The controller 210 may allow the signals to be transmitted to and received from the memory device 220 in parallel through different channels. For example, the controller 210 may allow another command to be transmitted to the memory device 220 through the second channel CH2 while the command is transmitted to the memory device 220 through the first channel CH1. For example, the controller 210 may allow other data from the memory device 220 to be received through the second channel CH2 while data from the memory device 220 is received through the first channel CH1.

Each of the non-volatile memories connected to the controller 210 through the same channel may perform internal operations in parallel. For example, the controller 210 may allow the command and the address to be sequentially transmitted to the non-volatile memories NVM11 to NVM14 through the first channel CH1. When the command and the address are transmitted to the non-volatile memories NVM11 to NVM14, each of the non-volatile memories NVM11 to NVM14 may perform the operation according to the command in parallel.

The non-volatile memories NVM11 to NVM24 may include the plurality of memory blocks. FIG. 3 shows memory blocks BLK included in the non-volatile memories NVM11 to NVM14. The memory device 220 may include a superblock SB including the memory blocks BLK included in the non-volatile memories NVM11 to NVM14. The controller 210 may allow continuous data to be distributed and stored in the memory blocks BLK included in the superblock SB. The memory blocks BLK included in the superblock SB may be accessed in parallel, thus increasing throughput of the write operation and read operation of data when the continuous data is stored in the superblock SB.

Additionally, the memory blocks BLK included in the superblock SB may be almost simultaneously programmed and erased, and management data associated with the memory blocks BLK may thus be managed in units of the superblock SB. For example, data such as the wearout degree, read count and data duration of the memory blocks may be managed in the units of the superblocks SB.

Figure 4:
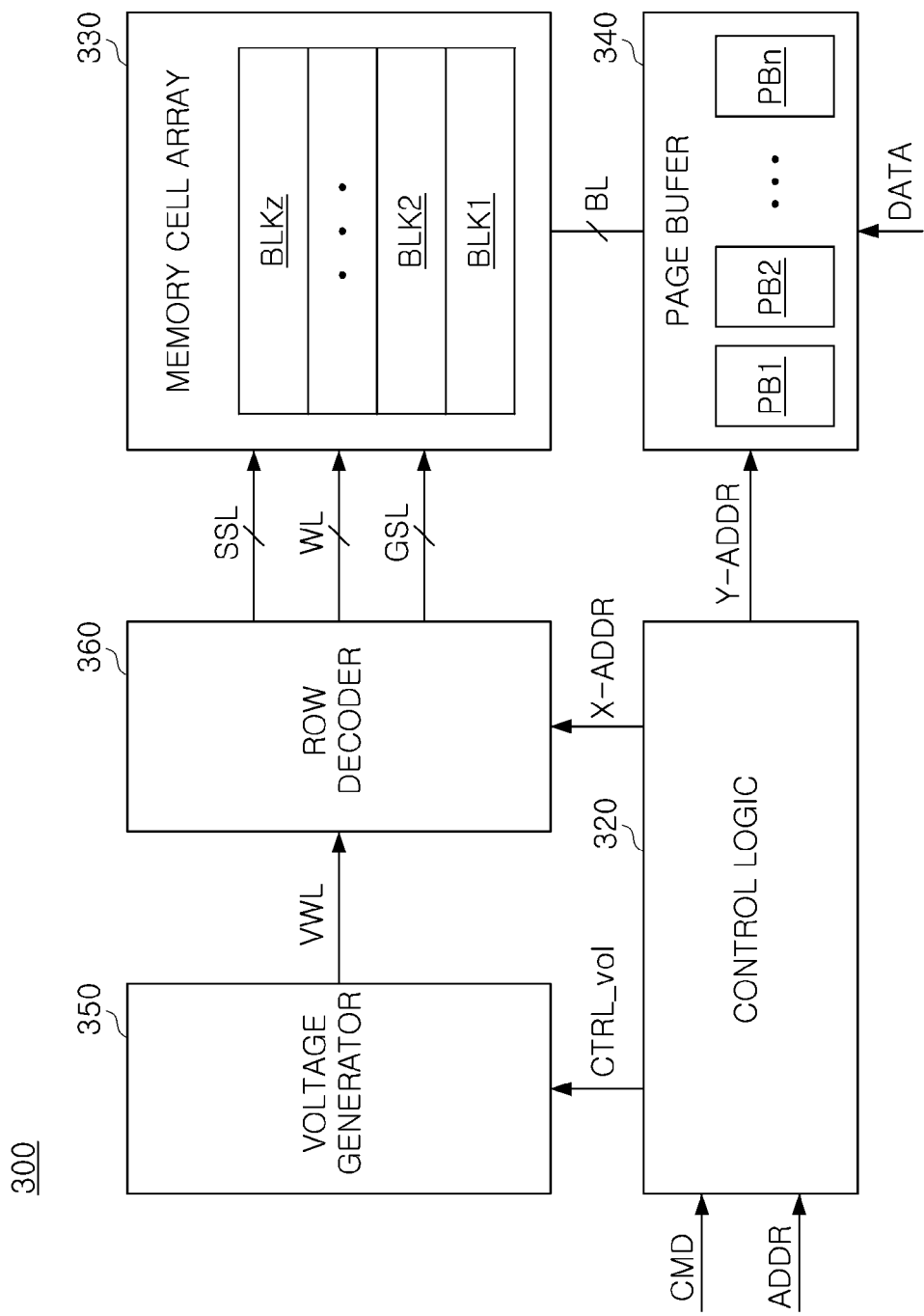
FIGS. 4 and 5 are diagrams for more specifically explaining a non-volatile memory.
Figure 5:
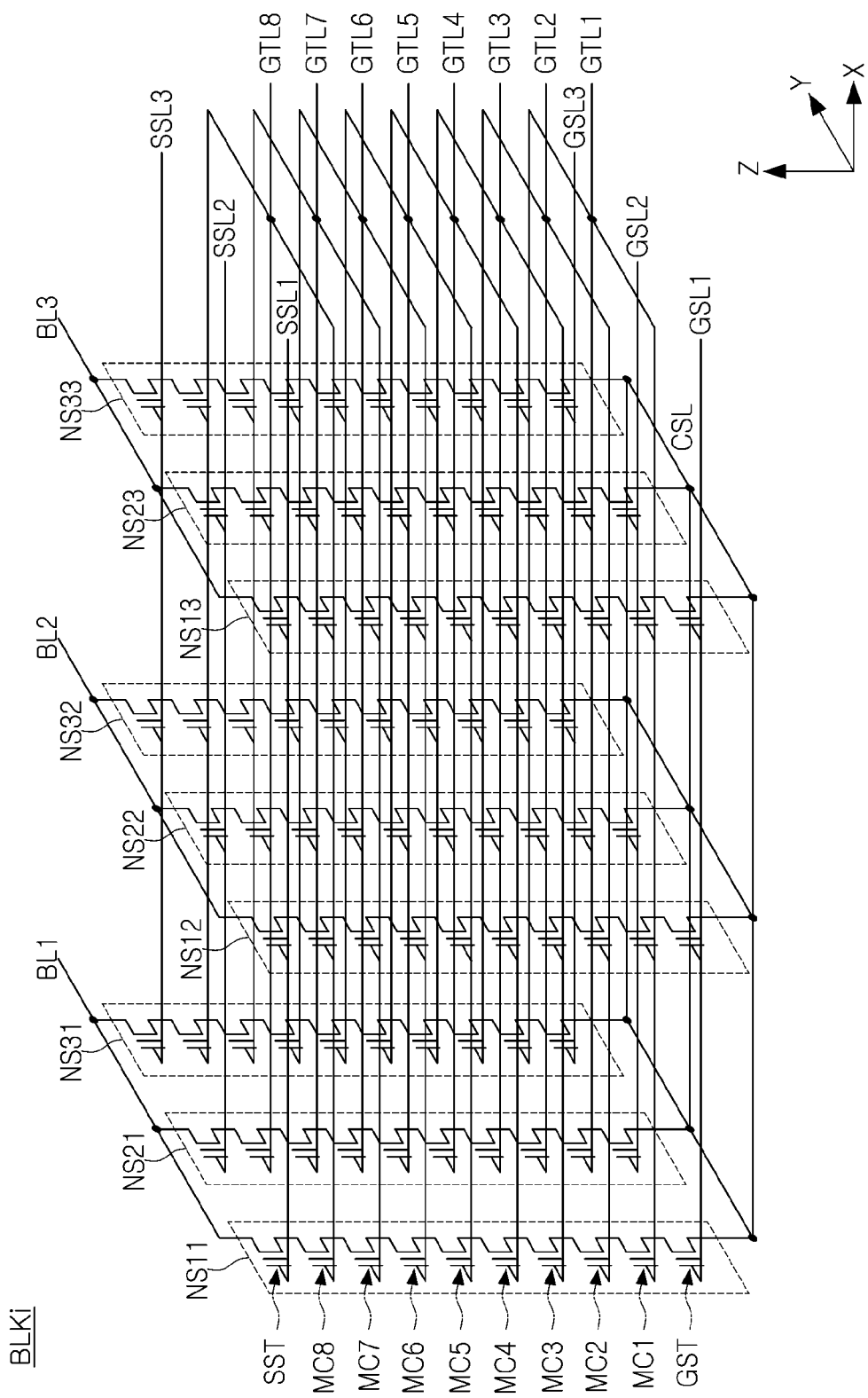

FIGS. 4 and 5 are diagrams for more specifically explaining a non-volatile memory.

FIG. 4 is an example block diagram showing the non-volatile memory. Referring to FIG. 4, a non-volatile memory 300 may include a control logic circuit 320, a memory cell array 330, a page buffer 340, a voltage generator 350 and a row decoder 360. The non-volatile memory 300 may further include a memory interface circuit for receiving a command CMD and an address ADDR from an external device, and exchanging data DATA with the external device, and further include a column logic, a pre-decoder, a temperature sensor, a command decoder, an address decoder or the like.

The control logic circuit 320 may control various operations in the non-volatile memory 300. The control logic circuit 320 may output various control signals in response to the command CMD and/or the address ADDR from the memory interface circuit. For example, the control logic circuit 320 may output a voltage control signal CTRL_vol, a row address X-ADDR or a column address Y-ADDR.

The memory cell array 330 may include the plurality of memory blocks BLK1 to BLKz (here, z is a positive integer), and each of the plurality of memory blocks BLK1 to BLKz may include the plurality of memory cells. The memory cell array 330 may be connected to the page buffer 340 through bit lines BL, and may be connected to the row decoder 360 through word lines WL, string selection lines SSL and ground selection lines GSL.

In example embodiments, the memory cell array 330 may include a three-dimensional memory cell array, and the three-dimensional memory cell array may include a plurality of NAND strings. Each NAND string may include the memory cells each connected to the word lines vertically stacked on a substrate. U.S. Pat. Nos. 7,679,133, 8,553,466, 8,654,587, 8,559,235, and U.S. Patent Application Publication No. 2011/0233648, which describe non-volatile memory devices, are incorporated by reference herein in their entireties. In example embodiments, the memory cell array 330 may include a two-dimensional memory cell array, and the two-dimensional memory cell array may include the plurality of NAND strings disposed in row and column directions.

The page buffer 340 may include a plurality of page buffers PB1 to PBn (here, n is an integer of 3 or more), and the plurality of page buffers PB1 to PBn may each be connected to the memory cells through the plurality of bit lines BL. The page buffer 340 may select at least one bit line from the bit lines BL in response to the column address Y-ADDR. The page buffer 340 may be operated as a write driver or a sense amplifier, based on an operation mode. For example, during the write operation, the page buffer 340 may apply a bit line voltage corresponding to data to be programmed to the selected bit line. During the read operation, the page buffer 340 may detect the current or voltage of the selected bit line to detect data stored in the memory cell.

The voltage generator 350 may generate various types of voltages for performing the program, read and erase operations, based on the voltage control signal CTRL_vol. For example, the voltage generator 350 may generate a program voltage, a read voltage, a program verification voltage, an erase voltage or the like as a word line voltage VWL.

The row decoder 360 may select one of the plurality of word lines WL and select one of the plurality of string selection lines SSL in response to the row address X-ADDR. For example, the row decoder 360 may apply the program voltage and the program verification voltage to the selected word line during the write operation, and may apply the read voltage to the selected word line during the read operation.

FIG. 5 is a diagram for explaining a three-dimensional (3D) V-NAND structure which may be applied to a storage device according to example embodiments of the present inventive concept. When the non-volatile memory of the storage device is implemented as a three-dimensional (3D) V-NAND type flash memory, each of the plurality of memory blocks included in the non-volatile memory may be represented as an equivalent circuit as shown in FIG. 5.

The memory block BLKi shown in FIG. 5 represents a three-dimensional memory block having a three-dimensional structure and positioned on the substrate. For example, the plurality of memory NAND strings included in the memory block BLKi may be positioned in a direction perpendicular to the substrate.

Referring to FIG. 5, the memory block BLKi may include the plurality of memory NAND strings NS11, NS12, NS12, NS21, NS22, NS23, NS31, NS32 and NS33 connected between bit lines BL1, BL2 and BL3 and a common source line CSL. Each of the plurality of memory NAND strings NS11 to NS33 may include a string selection transistor SST, a plurality of memory cells MC1, MC2, MC3, MC4, MC5, MC6, MC7 and MC8, and a ground selection transistor GST. FIG. 5 shows that each of the plurality of memory NAND strings NS11 to NS33 includes eight memory cells MC1, MC2, . . . and MC8, but the present inventive concept is not limited thereto.

The string selection transistor SST may be connected to corresponding string selection lines SSL1, SSL2 and SSL3. The plurality of memory cells MC1, MC2, . . . and MC8 may respectively be connected to corresponding gate lines GTL1, GTL2, GTL3, GTL4, GTL5, GTL6, GTL7 and GTL8. The gate lines GTL1, GTL2, . . . and GTL8 may correspond to the word lines, and some of the gate lines GTL1, GTL2, . . . and GTL8 may correspond to dummy word lines. The ground selection transistor GST may be connected to corresponding ground selection lines GSL1, GSL2 and GSL3. The string selection transistor SST may be connected to the corresponding bit lines BL1, BL2 and BL3, and the ground selection transistor GST may be connected to the common source line CSL.

The word lines of the same height may be commonly connected to each other, and the ground selection lines GSL1, GSL2 and GSL3 and the string selection lines SSL1, SSL2 and SSL3 may be separated from each other. FIG. 5 shows that the memory block BLKi is connected to eight gate lines GTL1, GTL2, . . . and GTL8 and three bit lines BL1, BL2 and BL3, but is not necessarily limited thereto.

Figure 6:
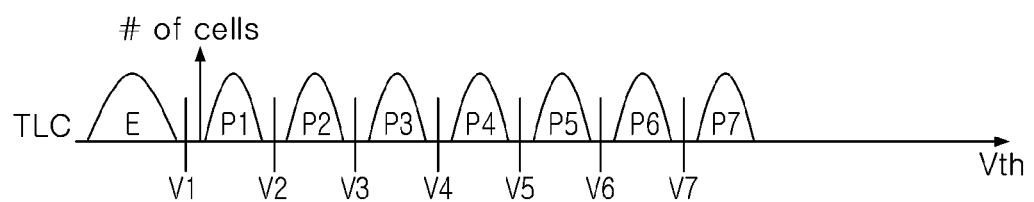
FIGS. 6 and 7 are diagrams for explaining a threshold voltage distribution of memory cells included in the non-volatile memory.
Figure 7:
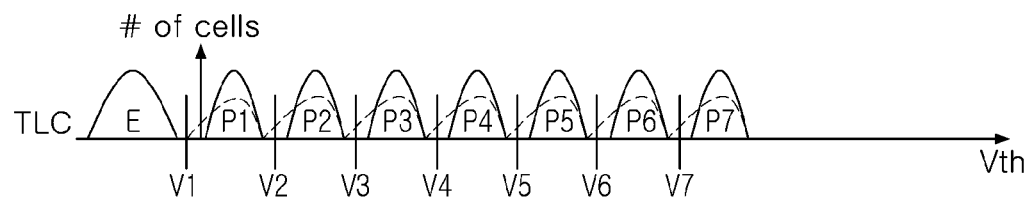

FIGS. 6 and 7 are diagrams for explaining a threshold voltage distribution of memory cells included in the non-volatile memory.

FIG. 6 shows the threshold voltage distribution of the memory cells in an ideal case.

When the program voltage is applied to the word line to which the memory cells are connected, charges may be introduced into the memory cells, thereby increasing threshold voltages of the memory cells. Due to minute differences in electrical characteristics of the plurality of memory cells, the threshold voltages of the memory cells in which the same data is programmed may form the threshold voltage distribution in a predetermined range. FIG. 6 shows the threshold voltage distribution of the memory cells when the memory cells are triple-level cells (TLC) storing 3-bit data. In FIG. 6, a horizontal axis of a graph indicates a magnitude of the threshold voltage, and a vertical axis indicates the number of the memory cells.

The memory cell may have the threshold voltage corresponding to any one of an erase state E and first, second, third, fourth, fifth, sixth and seventh program states P1, P2, P3, P4, P5, P6 and P7. First, second, third, fourth, fifth, sixth and seventh read voltages V1, V2, V3, V4, V5, V6 and V7 may be the read voltages for distinguishing respective states from each other. For example, when the first read voltage V1 is applied to the word line to which the memory cells are connected, the current may smoothly flow in the bit line to which first memory cells having the threshold voltage lower than the first read voltage V1 are connected. In other words, the first memory cells may be read as on cells. On the other hand, no current may flow in the bit line to which second memory cells having the threshold voltage higher than the first read voltage V1 are connected. In other words, the second memory cells may be read as off cells.

When the first read voltage V1 is applied to the memory cells, it is possible to distinguish the erase state E and the other states from each other. Similarly, when the second to seventh read voltages V2-V7 are further applied to the memory cells, it is possible to distinguish all the erase state E and the program states P1 to P7.

When the memory cells are the triple-level cells (TLC), different 3-bit data may be mapped to the threshold voltage of the erase and program states E and P1 to P7 of the memory cells. Each bit of the 3-bit data may be referred to as a most significant bit (MSB), a central significant bit (CSB) or a least significant bit (LSB).

When time elapses after the memory cells are programmed, charges introduced into the memory cells may leak and the memory cells may have lower threshold voltages. In other words, the threshold voltage distribution may be deteriorated.

FIG. 7 shows the deteriorated threshold voltage distribution of the memory cells.

In FIG. 7, a horizontal axis of a graph indicates a magnitude of the threshold voltage, and a vertical axis indicates the number of the memory cells. In FIG. 7, the threshold voltage distribution shown by a solid line may be the same as an ideal threshold voltage distribution described with reference to FIG. 6, and the threshold voltage distribution shown by a broken line may be the deteriorated threshold voltage distribution.

The reliability of the data read from the memory cells may be deteriorated when the threshold voltage distribution of the memory cells is deteriorated. For example, when the threshold voltage distribution is deteriorated, the memory cells whose threshold voltage is lower than the seventh read voltage V7 may occur among the memory cells programmed to have the seventh program state P7. When the seventh read voltage V7 is applied to the word line to which the memory cells are connected, some of the memory cells programmed to have the seventh program state P7 may be read as having the sixth program state P6. In other words, the data read from the memory cells may include an error.

Even when the data read from the memory cells includes the error, the error may be corrected by the error correction unit 212 of the controller 210. However, when the number of the error bits included in the data is greater than a level that the error correction unit 212 is able to correct, the error may not be corrected, and the controller 210 may not allow the data read from the memory cells to be restored.

However, in accordance with an example embodiment of the present inventive concept, the controller 210 may allow the media scanning operation for restoring the threshold voltage distribution of the memory cells to be performed before the threshold voltage distribution of the memory cells is deteriorated to an extent that the data read from the memory cells may not be restored.

Figure 8:
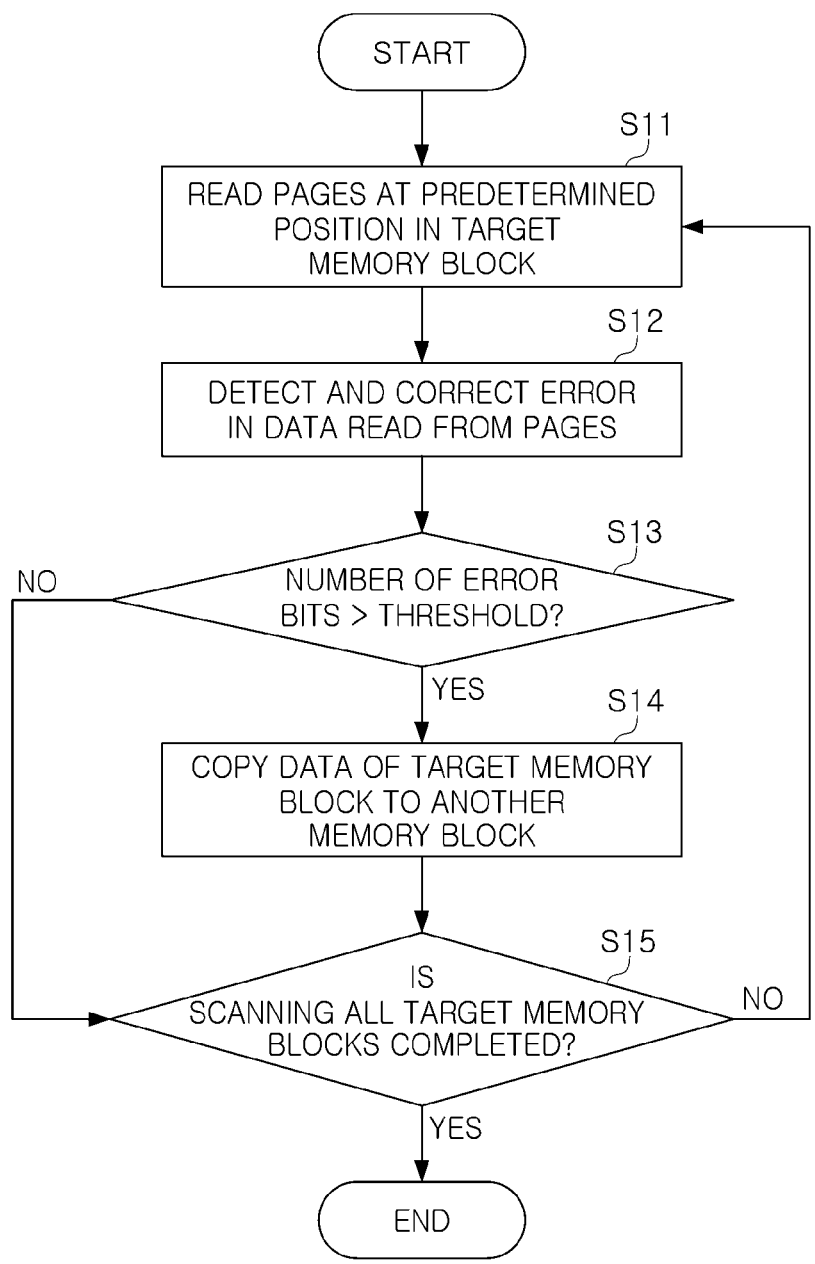
FIG. 8 is a flowchart for explaining a media scanning operation.

FIG. 8 is a flowchart for explaining the media scanning operation.

In operation S11, the controller 210 may control the memory device 220 to read pages at a predetermined position in a target memory block on which the media scanning operation is to be performed. In other words, some pages included in the target memory block may be read. All or some of the first to seventh read voltages V1 to V7 may be applied to the pages. For example, read voltages for distinguishing the most significant bit (MSB) from the first to seventh read voltages V1 to V7 may be applied to a first page of the pages, and read voltages for distinguishing the least significant bit (LSB) from the first to seventh read voltages V1 to V7 may be applied to a second page of the pages.

In operation S12, the controller 210 may allow error detection and correction of data read from the pages to be performed. When the controller 210 allows the error detection and correction of the data to be performed, the number of the error bits in the data may be determined.

In operation S13, the controller 210 may determine whether the number of the error bits in the data is greater than the threshold. The threshold may be determined not to be greater than a maximum number of the error bits that the error correction unit 212 is able to correct.

When the number of the error bits in the data is greater than the threshold (e.g., "YES" in operation S13), the threshold voltage distribution of the target memory block may be deteriorated. The controller 210 may allow the data of the target memory block to be copied to another memory block. The controller 210 may also allow the data from the target memory block to be read, and the error in the read data to be detected and corrected. In addition, the controller 210 may control the memory device 220 to program the error-corrected data into another memory block. When the error-corrected data is programmed in another memory block, the programmed data may have the ideal threshold voltage distribution.

When the number of the error bits in the data is not greater than the threshold (e.g., "No" in operation S13), the controller 210 may allow operation S14 to be skipped and operation S15 to be performed.

In operation S15, the controller 210 may determine whether the scan operation on all target memory blocks of the memory device 220 is completed in operations S11 to S14, and allow operations S11 to operation S14 to be repeatedly performed until the scan operation on all target memory blocks is completed. All of the memory blocks included in the memory device 220 may be determined as the target memory blocks, or some of the memory blocks included in the memory device 220 that have a risk of the deteriorated threshold voltage may be determined as the target memory blocks.

As described above, the media scanning operation may be triggered when the duration of the data programmed in the memory device 220 is greater than the threshold. The data duration may be determined for each memory block or for each superblock. Hereinafter, a method of determining the data duration of the superblock is described in detail with reference to FIG. 9.

Figure 9:
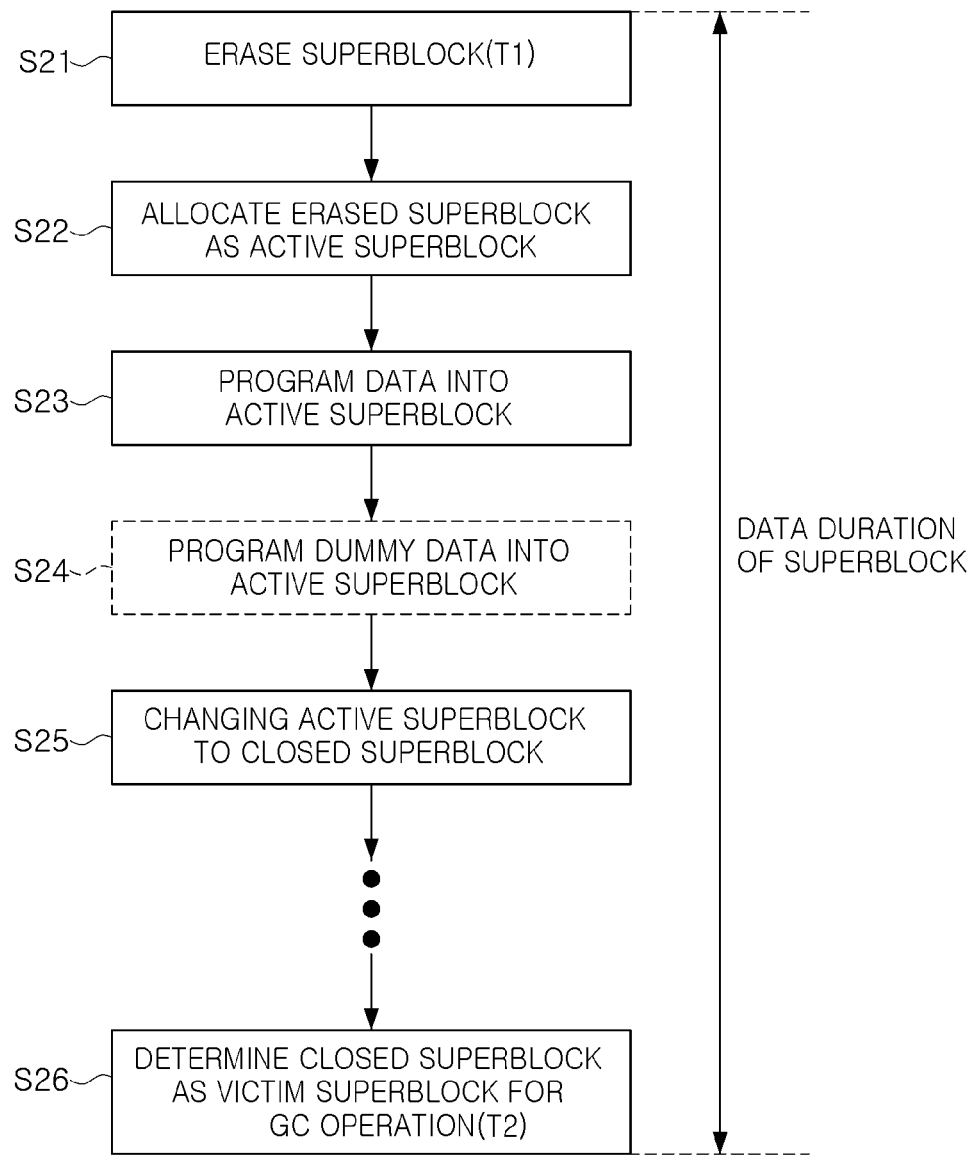
FIG. 9 is a flowchart for explaining data duration.

FIG. 9 is a flowchart for explaining the data duration.

In operation S21, the controller 210 may allow the superblock selected from the plurality of superblocks included in the memory device 220 to be erased. For example, the controller 210 may allow the superblock storing only invalidated data to be selected from the plurality of superblocks, and allow the selected superblock to be erased. A time point at which the superblock is erased may be referred to as a first time point T1.

In operation S22, the controller 210 may allow the erased superblock to be allocated as an active superblock. The active superblock may refer to a superblock allocated to program data. In other words, the active superblock is a superblock in which data is to be written.

In operation S23, when the active superblock is allocated, the controller 210 may control the memory device 220 to sequentially program data into the active superblock until all pages of the active superblock are programmed. It is to be understood that logical addresses of data sequentially programmed into the active superblocks are not necessarily contiguous.

When some pages of the active superblock are left in the erased state without being programmed, the charges introduced to the memory cells of the programmed pages may leak. For example, the charges may leak into the pages having the erase state. Accordingly, when the erased page remains in the active superblock after a predetermined time (for example, 30 minutes) elapses since the first time point T1, the controller 210 may allow the write operation on all pages of the active superblock to be completed by controlling the memory device 220 to program dummy data into the erased page in operation S24. In this case, all of the pages of the active superblock will be programmed.

When all of the pages of the active superblock are programmed, in operation S25, the controller 210 may determine the active superblock as a closed superblock, and prevent data from being programmed into the superblock for the time being.

As time elapses, a ratio of invalidated data among data programmed in the closed superblock may be increased. The controller 210 may allow the garbage collection operation to be performed to secure the free space for the memory device 220.

In operation S26, the controller 210 may determine the closed superblock as the victim superblock for the garbage collection (GC) operation. For example, when the ratio of invalidated data in the closed superblock is greater than the threshold, the controller 210 may determine the closed superblock as the victim superblock, allow valid data in the victim superblock to be collected, and allow the collected valid data to be programmed into another superblock, thereby allowing the garbage collection operation to be performed. A time point at which the closed superblock is determined as the victim superblock may be referred to as a second time point T2. After the second time point T2, the superblock may be selected as a superblock to be erased to program other data.

As can be seen, data may be programmed into the superblock within the predetermined time from the first time point T1 at which the superblock is erased, and the data programmed into the superblock may need to continue to be programmed until the second time point T2. According to example embodiments of the present inventive concept, the controller 210 may determine an interval between the first time point T1 and the second time point T2 as the data duration of the superblock.

When the workload of the host 100 is centered on the hot data, the data stored in the storage device 200 may be frequently updated, and the data stored in the superblock may be invalidated within a short time. Accordingly, the data duration may be shortened, and the threshold voltage distribution of the memory cells may not be significantly deteriorated within the data duration. On the other hand, when the workload of the host 100 is centered on cold data, the data duration of the superblock may be long, and the threshold voltage distribution of the memory cells may be significantly deteriorated within the data duration.

According to example embodiments of the present inventive concept, when the data duration of the superblock is greater than the threshold, the storage device 200 may perform the media scanning operation for maintaining the reliability of the data stored in the memory device 220. Hereinafter, an operation of the storage device 200 according to example embodiments of the present inventive concept is described in detail with reference to FIG. 10.

Figure 10:
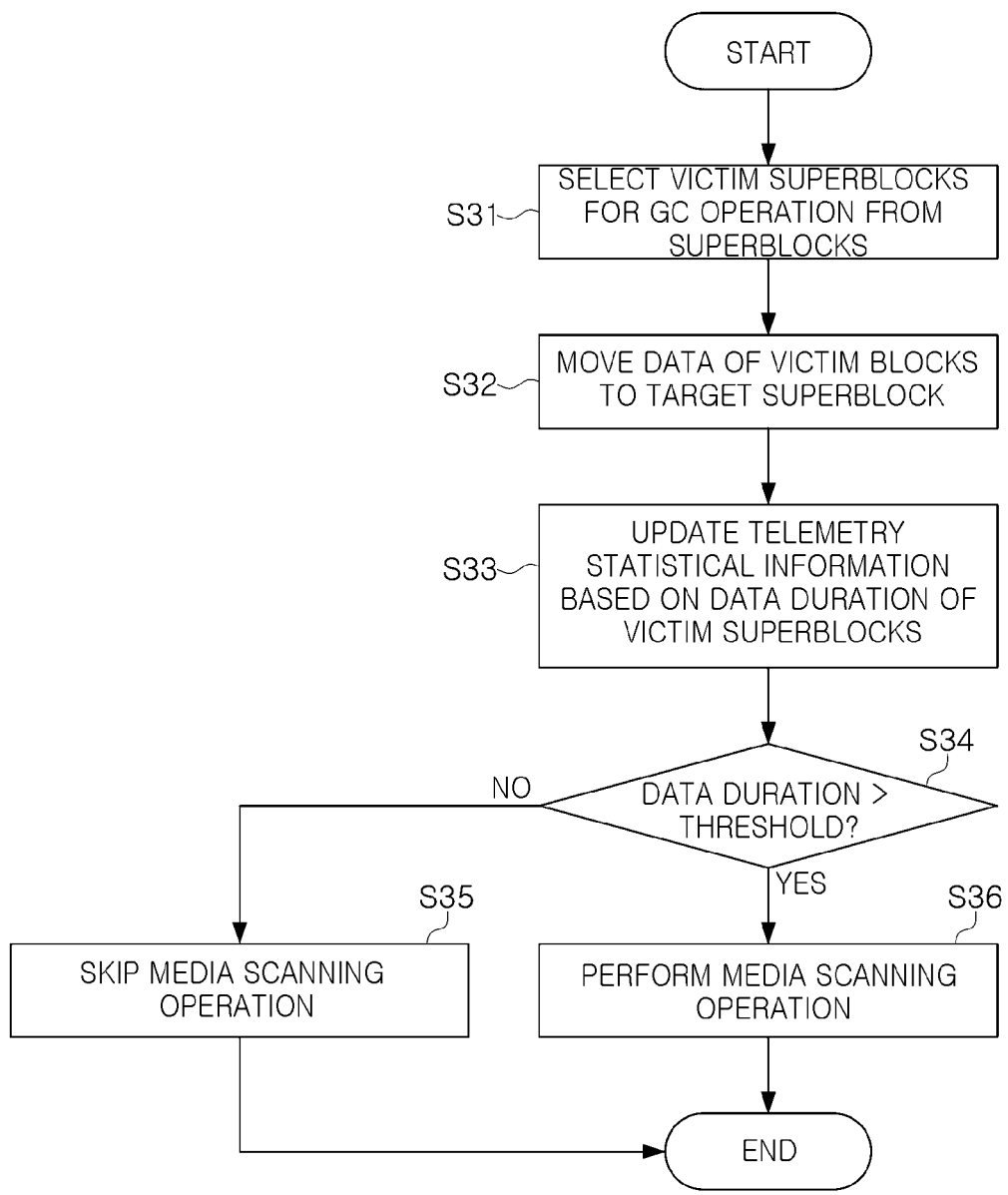
FIG. 10 is a flowchart for explaining an operation of the storage device according to example embodiments of the present inventive concept.

FIG. 10 is a flowchart for explaining the operation of the storage device according to example embodiments of the present inventive concept.

In operation S31, the controller 210 may allow the victim superblocks for the garbage collection (GC) operation to be selected from the superblocks. The controller 210 may determine the time point at which the victim superblocks are selected as the second time point T2 of the victim superblocks.

In operation S32, the controller 210 may allow the valid data of the victim blocks to be collected and allow the collected valid data to be moved to a target superblock on which the garbage collection operation to be performed, thereby allowing the garbage collection operation to be performed.

In operation S33, the controller 210 may allow the telemetry log to be updated based on the data duration of the victim superblocks. The telemetry log may include statistical information on the data duration of the superblocks, and may be used to adjust the threshold of the media scanning operation. A description of a specific method for the controller 210 to allow the telemetry log to be updated will be described below with reference to FIG. 11.

In operation S34, the controller 210 may determine whether the data duration of the victim superblocks is greater than the threshold.

When the data duration of the victim superblocks is not greater than the threshold (e.g., "NO" in operation S34), it is possible to guarantee the reliability of the data stored in the memory device 220 even when the controller 210 does not allow the media scanning operation to be performed. Therefore, in operation S35, the controller 210 may allow the media scanning operation on the memory device 220 to be skipped.

On the other hand, when the data duration of the victim superblocks is greater than the threshold (e.g., "YES" in operation S35), the controller 210 may allow the media scanning operation on the memory device 220 to be performed in operation S36.

Figure 11:
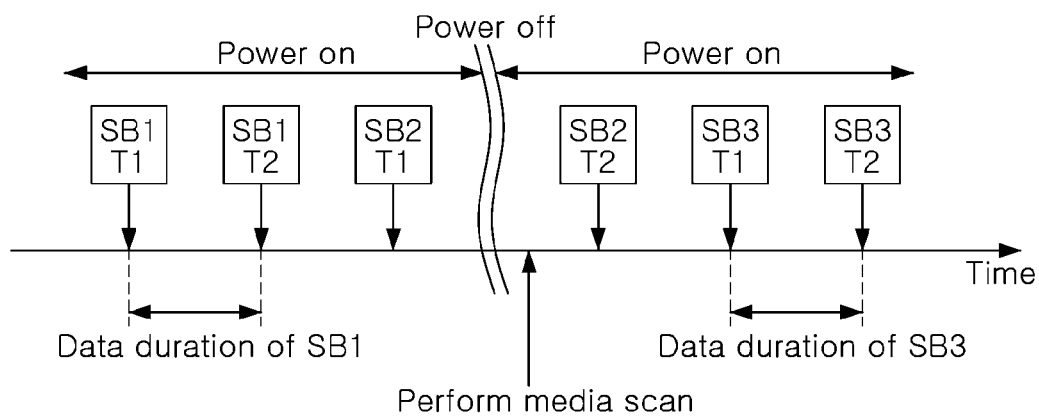
FIG. 11 is a diagram for explaining an update operation of a telemetry log according to example embodiments of the present inventive concept.

FIG. 11 is a diagram for explaining an update operation of the telemetry log according to example embodiments of the present inventive concept.

According to example embodiments of the present inventive concept, the controller 210 may allow the telemetry log to be updated by using the data duration of the superblock only when the first time point T1 and second time point T2 of the superblock are included in one power-on period.

FIG. 11 shows the first time point T1 at which first, second and third superblocks SB1, SB2 and SB3 are erased and the second time point T2 at which the first to third superblocks SB1 to SB3 are selected as the victim blocks over time. FIG. 11 shows time in which the storage device 200 is in a power-on state and in a power-off state together.

As shown in FIG. 11, the first time point T1 and the second time point T2 of the first superblock SB1 may be included in one power-on period. In other words, the first superblock SB1 may be erased in one power-on period, and may be selected as the victim superblock after data is programmed. The controller 210 may allow information on the first time point T1 to be stored in the memory included in the controller 210 when the first superblock SB1 is erased, and determine the interval between the first time point T1 and the second time point T2 as the data duration when the first superblock SB1 is selected as the victim superblock. In addition, the controller 210 may allow the telemetry log to be updated by using the data duration of the first superblock SB1. Similarly, the first time point T1 and second time point T2 of the third superblock SB3 may be included in one power-on period. The controller 210 may allow the telemetry log to be updated by using the data duration of the third superblock SB3.

Additionally, while the storage device 200 is powered off, the threshold voltage distribution of the memory cells in the memory device 220 may be entirely deteriorated. When the storage device 200 is powered on, the controller 210 may allow the media scanning operation on the memory device 220 to be performed to recover the deteriorated threshold voltage distribution of the memory cells.

After the second superblock SB2 is erased and data is then programmed in the second superblock SB2, the storage device 200 may be powered off while the data is programmed in the second superblock SB2. Regardless of a length of the power-off period of the storage device 200, the threshold voltage distribution of the second superblock SB2 may be recovered after the storage device 200 is powered on. When the first time point T1 and second time point T2 of the second superblock SB2 do not belong to one power-on period, the controller 210 may allow the data duration of the second superblock SB2 not to be reflected in the telemetry log. In other words, the data duration of the second superblock SB2 is not included in the telemetry log when the first time point T1 and the second time point T2 of the second superblock SB2 do not belong to one power-on period.

Additionally, information on the data duration may be collected for all superblocks included in the memory device 220, and the telemetry log may be integrally managed for the entire memory device 220. However, the present inventive concept is not limited thereto.

For example, the controller 210 may allow a storage space of the memory device 220 to be divided into a plurality of namespaces and allow the namespaces to be provided to the host 100. The namespace may be a logical storage space, and the different namespaces on host 100 may be recognized as independent storage spaces. When the storage device 200 has the plurality of namespaces, the storage device 200 may manage the telemetry log for each namespace. For example, when the data duration of a certain superblock included in the memory device 220 is determined, the telemetry log of the namespace to which a logical address of the data stored in the superblock belongs may be updated using the data duration.

Additionally, as shown in FIG. 10, example embodiments of the present inventive concept are described by taking as an example, the case where the controller 210 compares the data duration of the superblock with one threshold and determines whether the media scanning operation is to be performed. However, the present inventive concept is not limited thereto, and the controller 210 may compare the data duration of the superblock with two or more thresholds, and allow two or more types of the media scanning operations to be selectively performed based on a comparison result.

Figure 12:
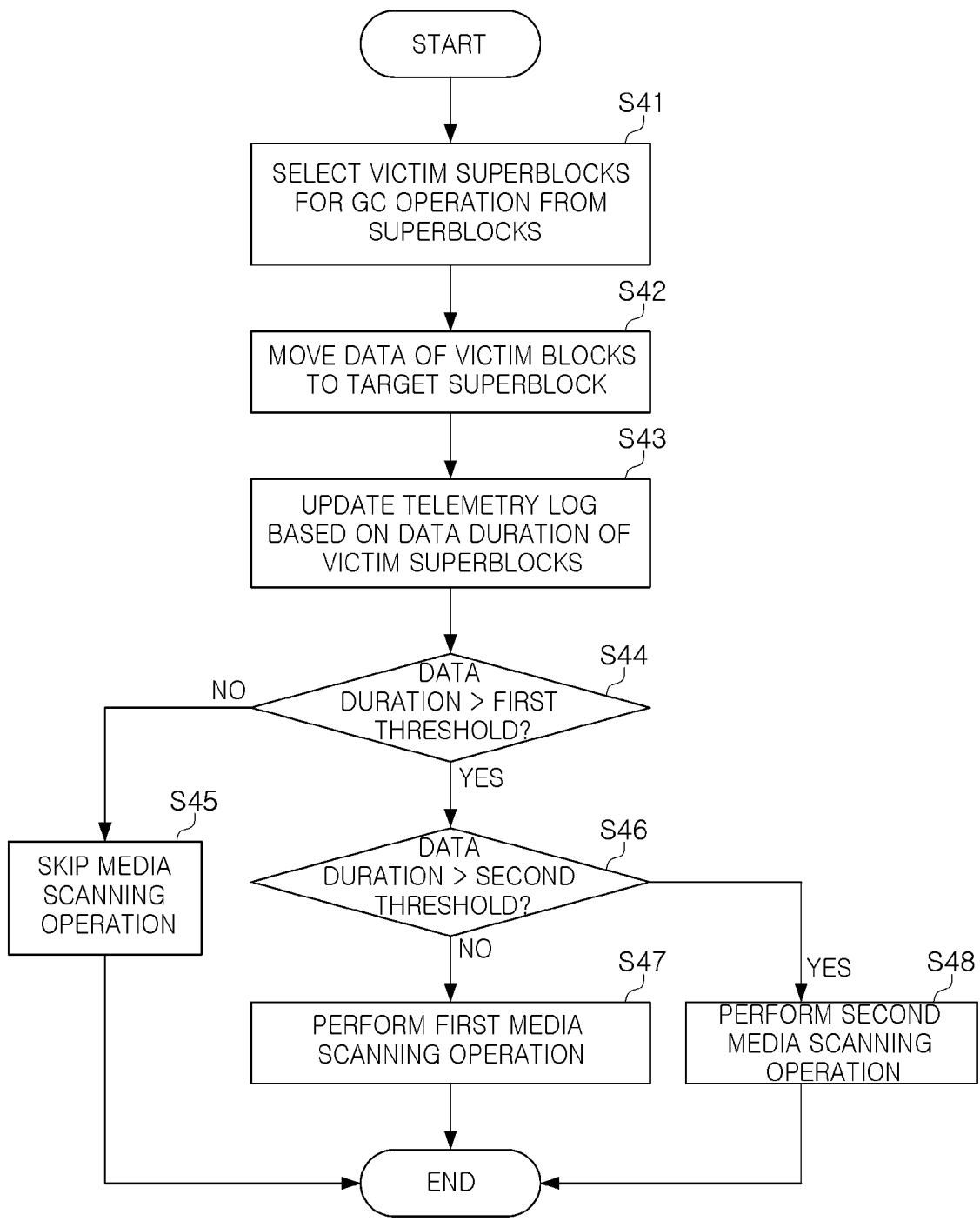
FIG. 12 is a flowchart for explaining an operation of the storage device according to example embodiments of the present inventive concept.

FIG. 12 is a flowchart for explaining an operation of the storage device according to example embodiments of the present inventive concept.

Operations S41 to S43 may be performed in the same manner as operations S31 to S33 described with reference to FIG. 10.

In operation S44, the controller 210 may determine whether the data duration of the superblock is greater than a first threshold.

When the data duration of the superblock is not greater than the first threshold (e.g., "NO" in operation S44), the controller 210 may allow the media scanning operation on the memory device 220 to be skipped in operation S45.

When the data duration of the superblock is greater than the first threshold (e.g., "YES" in operation S44), the controller 210 may determine whether the data duration of the superblock is greater than a second threshold greater than the first threshold in operation S46.

When the data duration of the superblock is not greater than the second threshold (e.g., "NO" in operation S46), the controller 210 may allow a first scan operation to be performed in operation S47. In other words, a first media scanning operation may be performed.

When the data duration of the superblock is greater than the second threshold (e.g., "YES" in operation S46), the controller 210 may allow a second scan operation to be performed in operation S48. In other words, a second media scanning operation may be performed.

The first scan operation and the second scan operation may be different types of media scanning operations. As a first example, the second scan operation may be a media scanning operation for scanning the memory blocks more precisely than the first scan operation. For example, N (here, N is a natural number) target pages among the pages of the target superblock may be read in the first scan operation, and M (here, M is a natural number and more than N) target pages among the pages of the target superblock may be read in the second scan operation.

As a second example, the second scan operation may be a media scanning operation for scanning a larger number of the target memory blocks than the number of the first scan operation. For example, only superblocks whose data duration is greater than the first threshold may be selected as the target superblocks in the first scan operation, and all of the superblocks included in the memory device 220 may be selected as the target superblocks in the second scan operation.

Additionally, as shown in FIG. 12, example embodiments of the present inventive concept are described by taking as an example, the case where the controller 210 compares the data duration of the superblock with two thresholds, but the present inventive concept is not limited thereto. The controller 210 may allow more detailed types of the media scanning operations to be selectively performed based on three or more thresholds.

The controller 210 may allow a criterion for triggering the media scanning operation, e.g., threshold, to be adjusted based on the telemetry log.

Figure 13A:
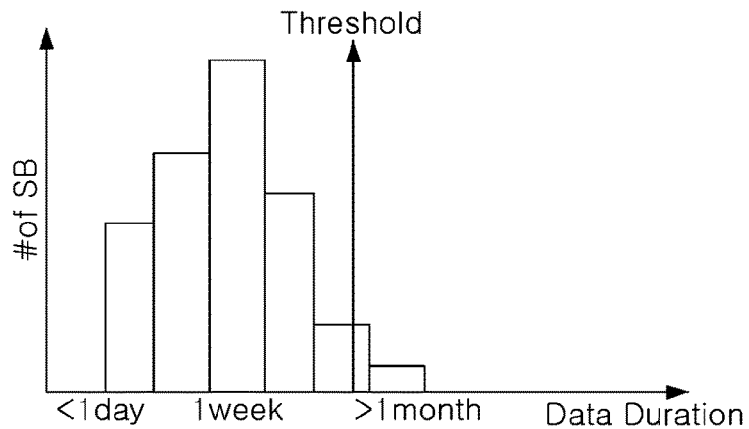
FIGS. 13A, 13B and 13C are flowcharts for explaining a method of adjusting a criterion for triggering the media scanning operation according to example embodiments of the present inventive concept.
Figure 13B:
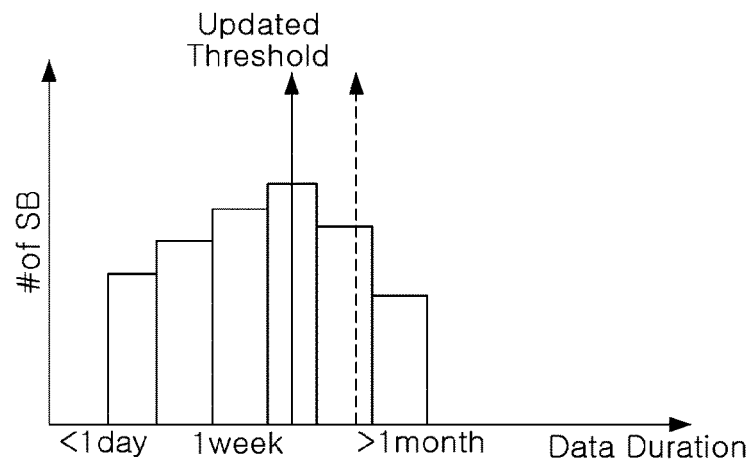
Figure 13C:
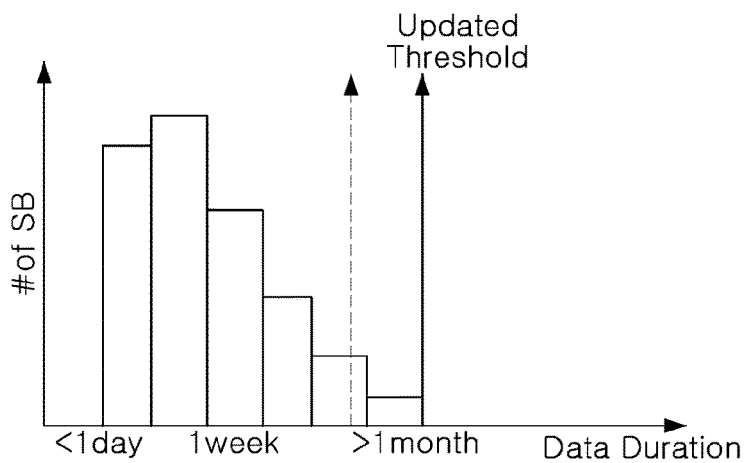

FIGS. 13A to 13C are flowcharts for explaining a method of adjusting the criterion for triggering the media scanning operation according to example embodiments of the present inventive concept.

FIG. 13A is a graph showing statistical information on the data duration included in the telemetry log at a specific time point. A horizontal axis of the graph indicates the data duration, and a vertical axis indicates the number of superblocks having the corresponding data duration. The graph of FIG. 13A shows the threshold of the data duration for triggering the media scanning operation.

FIG. 13B is a graph showing a first example of the statistical information on the data duration at a time point after the specific time point of FIG. 13A.

As shown in FIG. 13B, the number of superblocks having a statistically longer data duration may be increased compared to FIG. 13A. When the entire data duration of the superblock becomes longer, the reliability of the data stored in the memory device 220 may become lower. Therefore, the media scanning operation may be frequently performed on the memory device 220. Accordingly, when average data duration of the superblocks becomes longer, the controller 210 may allow the threshold of the data duration to be reduced so that the media scanning operation is performed more frequently.

FIG. 13C is a graph showing a second example of the statistical information on the data duration at the time point after the specific time point of FIG. 13A.

On the contrary to FIG. 13B, as shown in FIG. 13C, the number of superblocks having a statistically shorter data duration may be increased compared to FIG. 13A. When the average data duration of the superblocks becomes shorter, the controller 210 may allow the threshold of the data duration to be increased so that the media scanning operation is performed less frequently.

According to example embodiments of the present inventive concept, the controller 210 may allow the threshold of the data duration for triggering the media scanning operation to be adjusted by using the telemetry log. In addition, the telemetry log may be output to the host 100 and used to increase the functionality and reliability of the storage device 200. The controller 210 may allow the telemetry log to be output to the host 100 by complying with a non-volatile memory express (NVMe) interface protocol.

Additionally, the threshold of the data duration for triggering the media scanning operation may be commonly applied to the entire storage device 200, and the present inventive concept is not limited thereto. When the storage device 200 manages the telemetry log for each namespace, the storage device 200 may also determine the threshold of the data duration for each namespace. For example, the average data duration of the superblocks may become shorter in a first namespace storing the hot data, and the average data duration of the superblocks may become longer in a second namespace storing the cold data. The storage device 200 may adjust the threshold of the data duration for the first namespace upward as described with reference to FIG. 13C, and adjust the threshold of data duration for the second namespace downward as described with reference to FIG. 13B. The storage device 200 may control the threshold of the data duration for each namespace, thereby adjusting a period at which the media scanning operation is triggered for each namespace. Accordingly, it is possible to optimize the performance and reliability of the storage device 200.

Additionally, the storage device 200 may be an open-channel solid state drive (SSD) that entrusts the host 100 with some functions of a flash translation layer (FTL) driven by the controller 210. When the storage device 200 is the open-channel SSD, the threshold for triggering the media scan may also be adjusted by control of the host 100.

Figure 14:
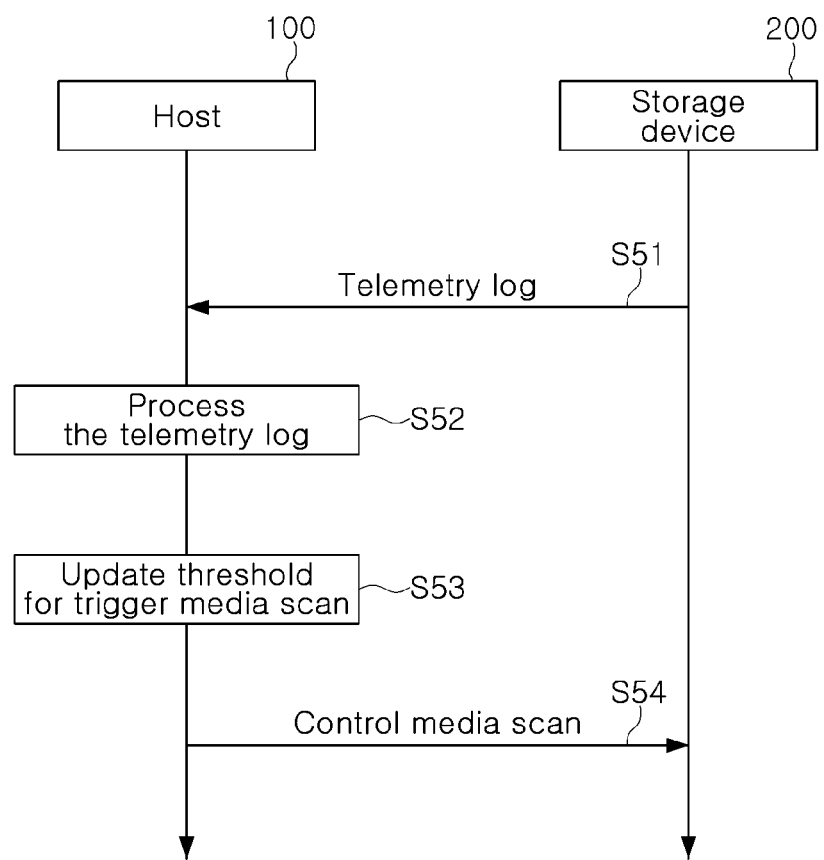
FIG. 14 is a flowchart for explaining an operation of the host-storage system according to example embodiments of the present inventive concept.

FIG. 14 is a flowchart for explaining an operation of the host-storage system according to example embodiments of the present inventive concept.

In operation S51, the storage device 200 may output the telemetry log to the host 100.

In operation S52, the host 100 may process the telemetry log obtained from the storage device 200. For example, the host 100 may analyze the telemetry log and use the analyzed telemetry log to increase the functionality and reliability of the storage device 200.

In operation S53, the host 100 may update the threshold for triggering the media scanning operation based on a result of analyzing the telemetry log.

In operation S54, the host 100 may control the media scanning operation on the storage device 200, based on the updated threshold.

Additionally, the controller 210 may allow a weight to be applied to the data duration when the telemetry log is updated based on the data duration.

Figure 15A:
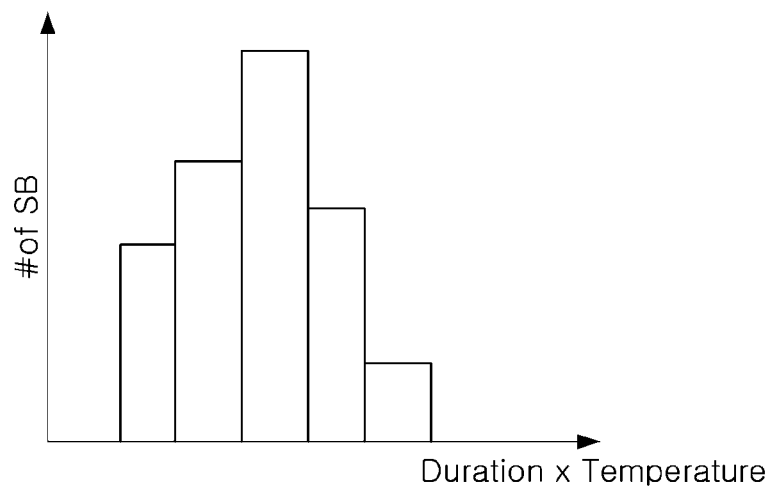
FIGS. 15A and 15B are diagrams for explaining an example of the telemetry log according to example embodiments of the present inventive concept.
Figure 15B:
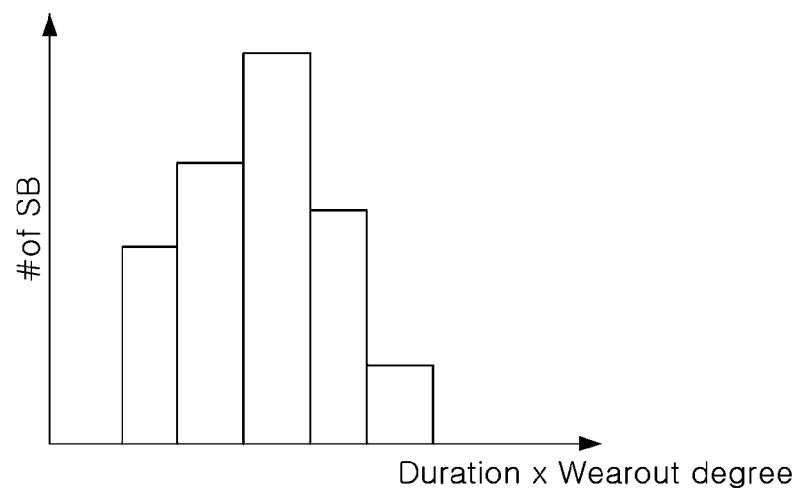

FIGS. 15A and 15B are diagrams for explaining an example of the telemetry log according to example embodiments of the present inventive concept.

Referring to FIG. 15A, the controller 210 may allow the weight to be assigned to the data duration of the superblock, based on information about temperatures of the non-volatile memories including the memory blocks included in the superblock, and reflect the weighted data duration in the telemetry log.

A temperature of the storage device 200 may depend on a position of the storage device 200 mounted in a data center or the like. When the same time elapses after data is programmed in the memory cells, the threshold voltages of the memory cells may be more severely deteriorated as a temperature of the non-volatile memory is higher. According to example embodiments of the present inventive concept, the host 100 may collect standardized information on the data duration from the storage devices 200 having various mounting environments. In addition, the storage device 200 may adjust the frequency at which the media scanning operation is triggered based on the mounting environment.

Referring to FIG. 15B, the controller 210 may allow the weight to be assigned to the data duration of the superblock, based on a wearout degree of the superblock, and reflect the weighted data duration in the telemetry log. The wearout degree of the superblock may be at least one of a program/erase (P/E) cycle of the superblock, an erase count and the number of times data is programmed in the superblock.

When the same time elapses after data is programmed in the memory cells, the threshold voltages of the memory cells may be more severely deteriorated as the wearout degree of the superblock is higher. According to example embodiments of the present inventive concept, the storage device 200 may adjust the frequency at which the media scanning operation is triggered based on the wearout degree of the superblock.

According to example embodiments of the present inventive concept, the controller 210 may further consider another factor as well as the data duration of the superblock to trigger the media scanning operation. Example embodiments in which the media scanning operation is triggered based on a data read history of the superblock are described in detail with reference to FIGS. 16 to 18.

Figure 16:
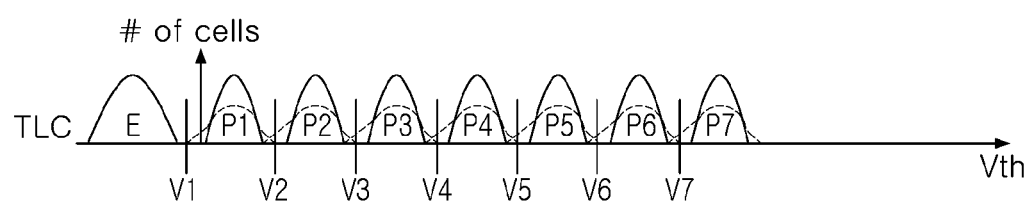
FIG. 16 is a diagram for explaining a threshold voltage distribution of the memory cells included in the non-volatile memory.

FIG. 16 shows the deteriorated threshold voltage distribution of the memory cells.

When time elapses after the memory cells are programmed, the charges introduced into the memory cells may leak and the memory cells may have the lower threshold voltages. On the other hand, the threshold voltage of the memory cells may become higher due to a read disturbance in which the charges are introduced to the memory cells when neighboring memory cells are read. In FIG. 16, the threshold voltage distribution shown by a solid line may be the same as the ideal threshold voltage distribution described with reference to FIG. 6, and the threshold voltage distribution shown by a broken line may be the deteriorated threshold voltage distribution. The deteriorated threshold voltage distribution may be laterally widened compared to the ideal threshold voltage distribution.

The controller 210 may trigger the media scanning operation by further considering the read history of the superblock.

Figure 17:
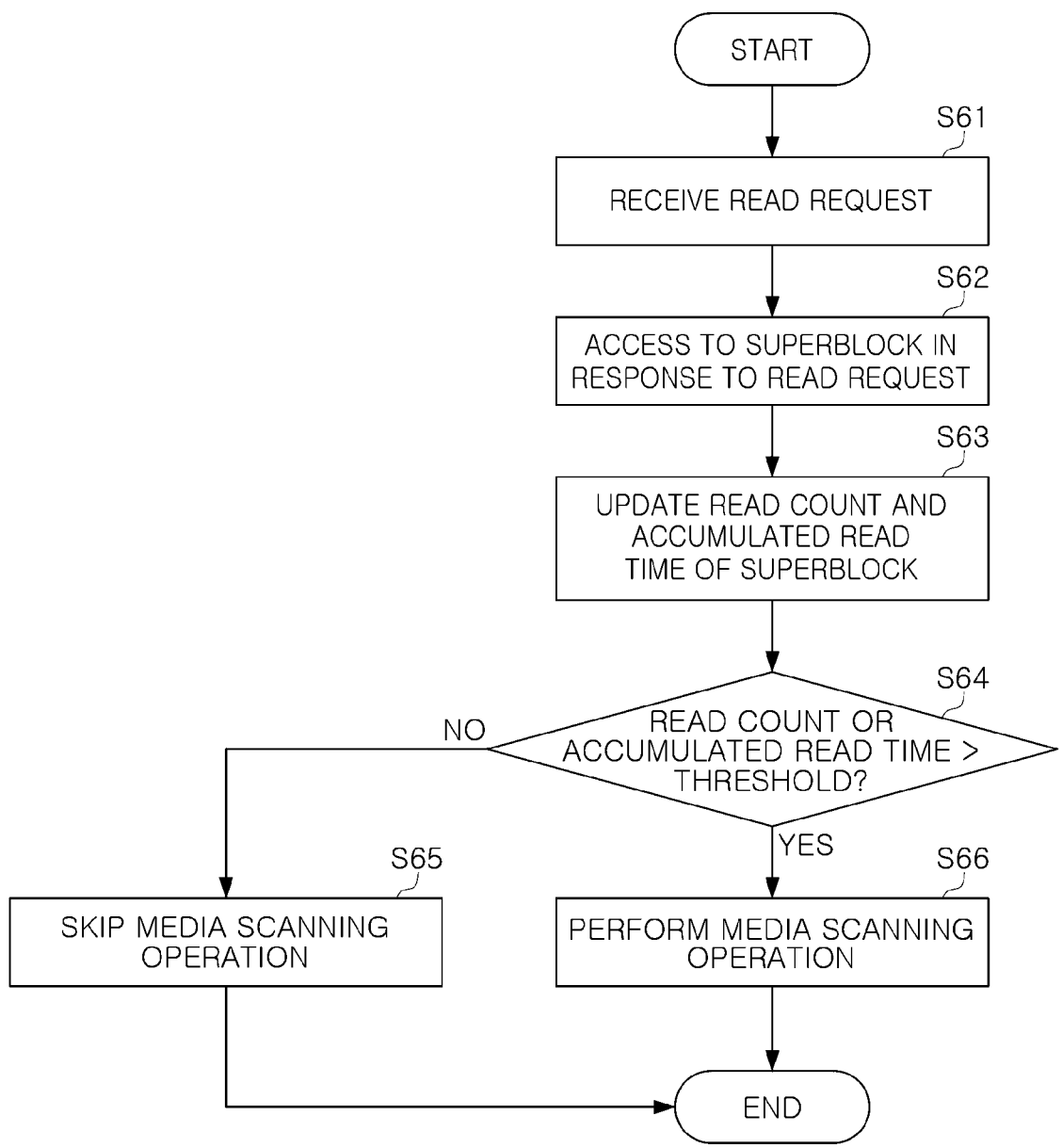
FIG. 17 is a flowchart for explaining an operation of the storage device according to example embodiments of the present inventive concept.

FIG. 17 is a flowchart for explaining an operation of the storage device according to example embodiments of the present inventive concept.

In operation S61, the controller 210 may receive a read request from the host 100.

In operation S62, the controller 210 may control the memory device 220 to read the superblock in response to the read request from the host 100.

In operation S63, the controller 210 may allow the information on read count and information on the accumulated read time of the superblock to be updated within a data duration range of the superblock. As the read count and the accumulated read time are increased, the memory cells may be significantly deteriorated due to the read disturbance.

Figure 18:
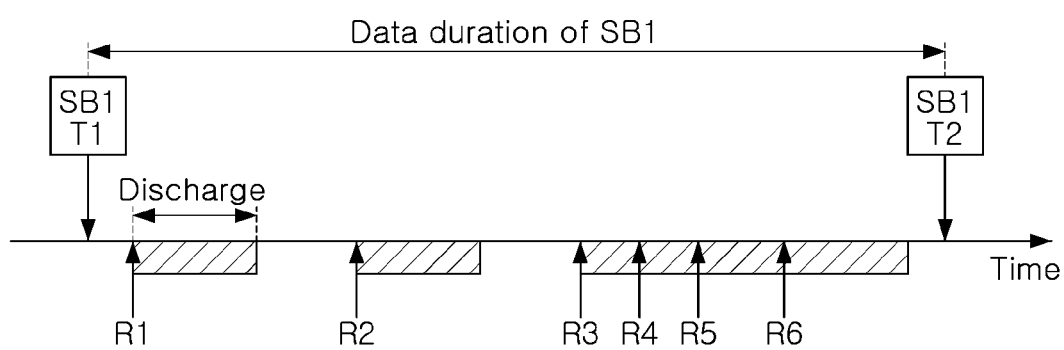
FIG. 18 is a diagram for explaining a read count and an accumulated read time of a superblock.

FIG. 18 is a diagram for explaining the read count and accumulated read time of a superblock.

FIG. 18 shows read time points R1, R2, R3, R4, R5 and R6 of the first superblock SB1 and the word line discharging time due to the read operation in the data duration range of the first superblock SB1.

To read the memory cells included in the memory block, the read voltage may be applied to the selected word lines connected to the memory cells, and a pass voltage higher than the read voltage may be applied to unselected word lines. A channel boosting due to the pass voltage may be performed on the word line adjacent to the selected word line among the unselected word lines, and hot carriers may be injected into the memory cells connected to the unselected word lines. The threshold voltages of the memory cells connected to the adjacent word lines may be increased to cause the read disturbance in which the threshold voltage distribution is deteriorated.

After the read voltage is applied to the selected word line and the pass voltage is applied to the unselected word lines, the read disturbance may occur until the pass voltage applied to the unselected word lines is discharged. As shown in FIG. 18, the read disturbance may occur during the discharge time after a first read operation R1.

Hatched times in FIG. 18 indicate time in which the read disturbance may occur due to the word line discharged by the first to sixth read operations R1 to R6. The time in which the read disturbance may occur may be referred to as the accumulated read time.

As the read count is increased, the threshold voltage distribution may be more severely deteriorated due to the read disturbance. In addition, when the read count is the same, the accumulated read time may become longer as a time interval between the read operations becomes larger, and the threshold voltage distribution may thus be severely deteriorated. Accordingly, the controller 210 may control the media scanning operation by considering not only the data duration, but also the read count and the accumulated read time.

Referring again to FIG. 17, the controller 210 may determine whether the read count or accumulated read time of the superblock is greater than the threshold in operation S64.

When none of the read count and the accumulated read time is greater than the threshold (e.g., "NO" in operation S64), the controller 210 may allow the media scanning operation to be skipped, operation S65.

On the other hand, when the read count or the accumulated read time is greater than the threshold (e.g., "YES" in operation S64), the controller 210 may allow the media scanning operation to be performed, operation S66.

According to example embodiments of the present inventive concept, the controller 210 may optimize the frequency at which the defense logic such as the media scanning operation is driven in consideration of a possibility that the threshold voltage distribution of the memory cell is deteriorated. For example, the controller 210 may trigger the media scanning operation when the threshold voltage distribution of the memory cell is highly likely to be deteriorated, and allow the media scanning operation to be skipped when the threshold voltage distribution is barely likely to be deteriorated. According to example embodiments of the present inventive concept, it is possible to increase the data input/output performance of the storage device 200, and to reduce power consumption of the storage device 200 while increasing the reliability of the data read from the memory device 220. Hereinafter, examples of systems to which the storage device according to example embodiments of the present inventive concept are applied are described with reference to FIGS. 19 and 20.

Figure 19:
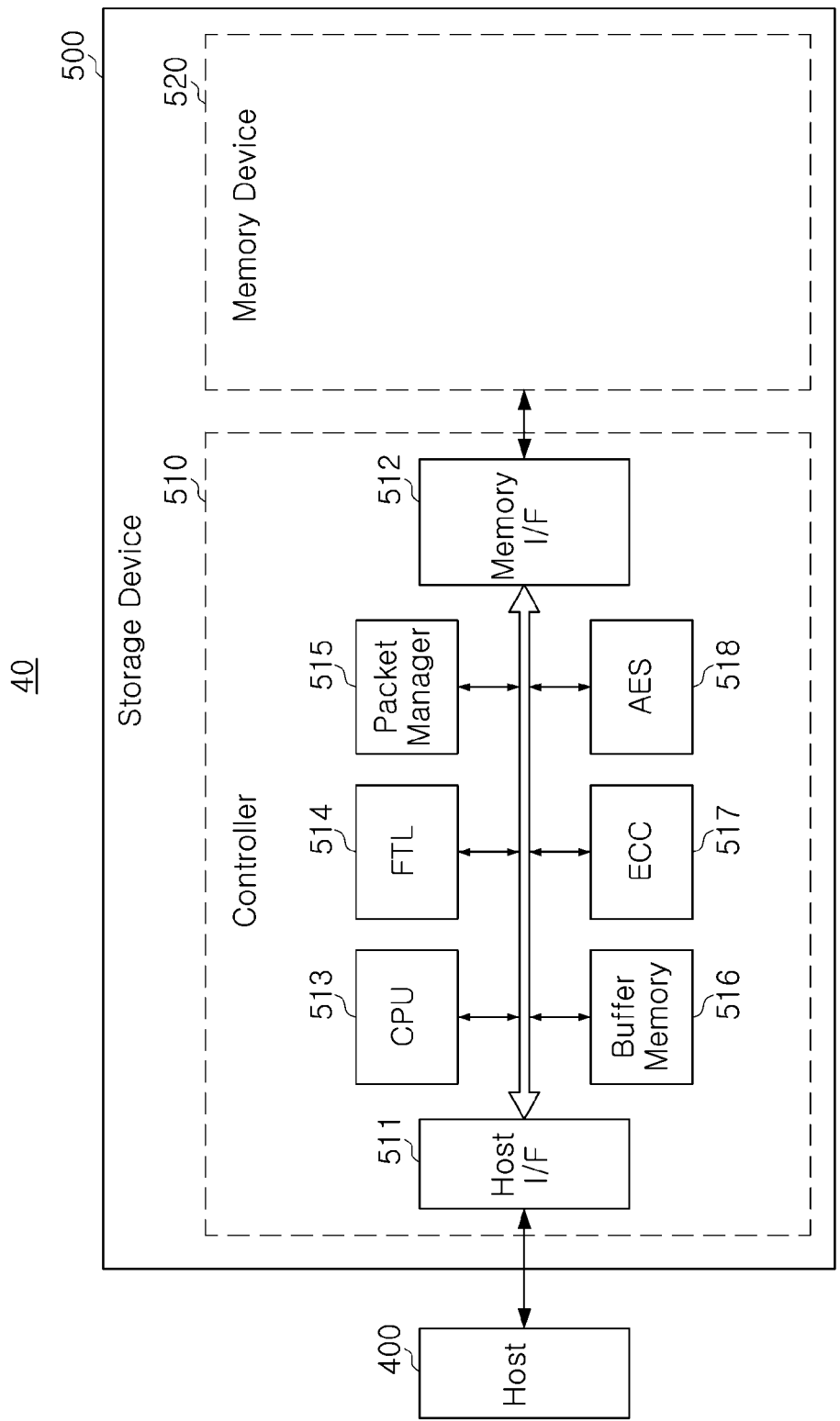
FIG. 19 is a diagram showing a host-storage system according to example embodiments of the present inventive concept.

FIG. 19 is a diagram showing a host-storage system according to example embodiments of the present inventive concept.

A host-storage system 40 may include a host 400 and a storage device 500. In addition, the storage device 500 may include a storage controller 510 and a memory device, e.g., a non-volatile memory (NVM), 520.

The host 400 may be an electronic device and may include at least one operating system. The host 400 may correspond to the host 100 described with reference to FIG. 1.

The storage device 500 may include storage media storing data, based on the request from the host 400. The storage device 500 may correspond to the storage device 200 described with reference to FIG. 1.

The memory device 520 may maintain stored data even when power is not supplied thereto. The memory device 520 may store data provided from the host 400 through the write operation, and may output data stored in the memory device 520 through the read operation.

The storage controller 510 may control the memory device 520 in response to the request from the host 400. For example, the storage controller 510 may provide the host 400 with the data read from the memory device 520, and store the data provided from the host 400 in the memory device 520. For this operation, the storage controller 510 may support an operation of the memory device 520 such as read, program and erase operations.

The storage controller 510 may include a host interface 511, a memory interface 512 and a central processing unit (CPU) 513. In addition, the storage controller 510 may further include a flash translation layer (FTL) 514, a packet manager 515, a buffer memory 516, an error correction code (ECC) engine 517 and an advanced encryption standard (AES) engine 518. The storage controller 510 may further include a working memory to which the flash translation layer (FTL) 514 is loaded, and data write and read operations on the memory device 520 may be controlled by the CPU 513 performing the flash translation layer.

The host interface 511 may transmit and receive a packet to and from the host 400. The packet transmitted from the host 400 to the host interface 511 may include a command or data to be written to the memory device 520, and the packet transmitted from the host interface 511 to the host 400 may include a response to the command or data read from the memory device 520.

The memory interface 512 may transmit the data to be written to the memory device 520 to the memory device 520 or receive the data read from the memory device 520. The memory interface 512 may be implemented to comply with a standard convention such as Toggle or open NAND flash interface (ONFI).

The flash translation layer 514 may perform several functions such as address mapping, wear-leveling and garbage collection. The address mapping operation may be an operation of changing the logical address received from the host 400 into the physical address used to actually store data in the memory device 520. The wear-leveling may be a technique for preventing excessive deterioration of a specific block by ensuring that the blocks in the memory device 520 are uniformly used, and may be implemented by using a firmware technique for balancing erase counts of physical blocks for example. The garbage collection may be a technique for securing capacity usable in the memory device 520 by copying the valid data of the block to a new block and then erasing the existing block.

According to example embodiments of the present inventive concept, the flash translation layer 514 may determine the data duration until data is invalidated after the data is programmed in the superblock of the memory device 520, and perform the media scanning operation on the memory device 520 when the data duration is greater than the threshold. The flash translation layer 514 may generate the telemetry log, and the telemetry log may include the statistical information on the data duration of the superblock. The flash translation layer 514 may adjust the threshold at which the media scanning operation is triggered based on the statistical information on the data duration.

The packet manager 515 may generate a packet according to a protocol of the interface negotiated with the host 400 or parse various information from a packet received from the host 400. In addition, the buffer memory 516 may temporarily store the data to be written to the memory device 520 or the data to be read from the memory device 520. The buffer memory 516 may be positioned in the storage controller 510, and may also be disposed outside the storage controller 510.

The ECC engine 517 may perform the error detection and correction function for the read data read from the memory device 520. For example, the ECC engine 517 may generate parity bits for write data which is to be written in the memory device 520, and the generated parity bits may be stored in the memory device 520 together with the write data. When reading the data from the memory device 520, the ECC engine 517 may correct an error in the read data by using the parity bits read from the memory device 520 together with the read data, and output the error-corrected read data.

The AES engine 518 may perform at least one of an encryption operation and a decryption operation on the data input to the storage controller 510 by using a symmetric-key algorithm.

Figure 20:
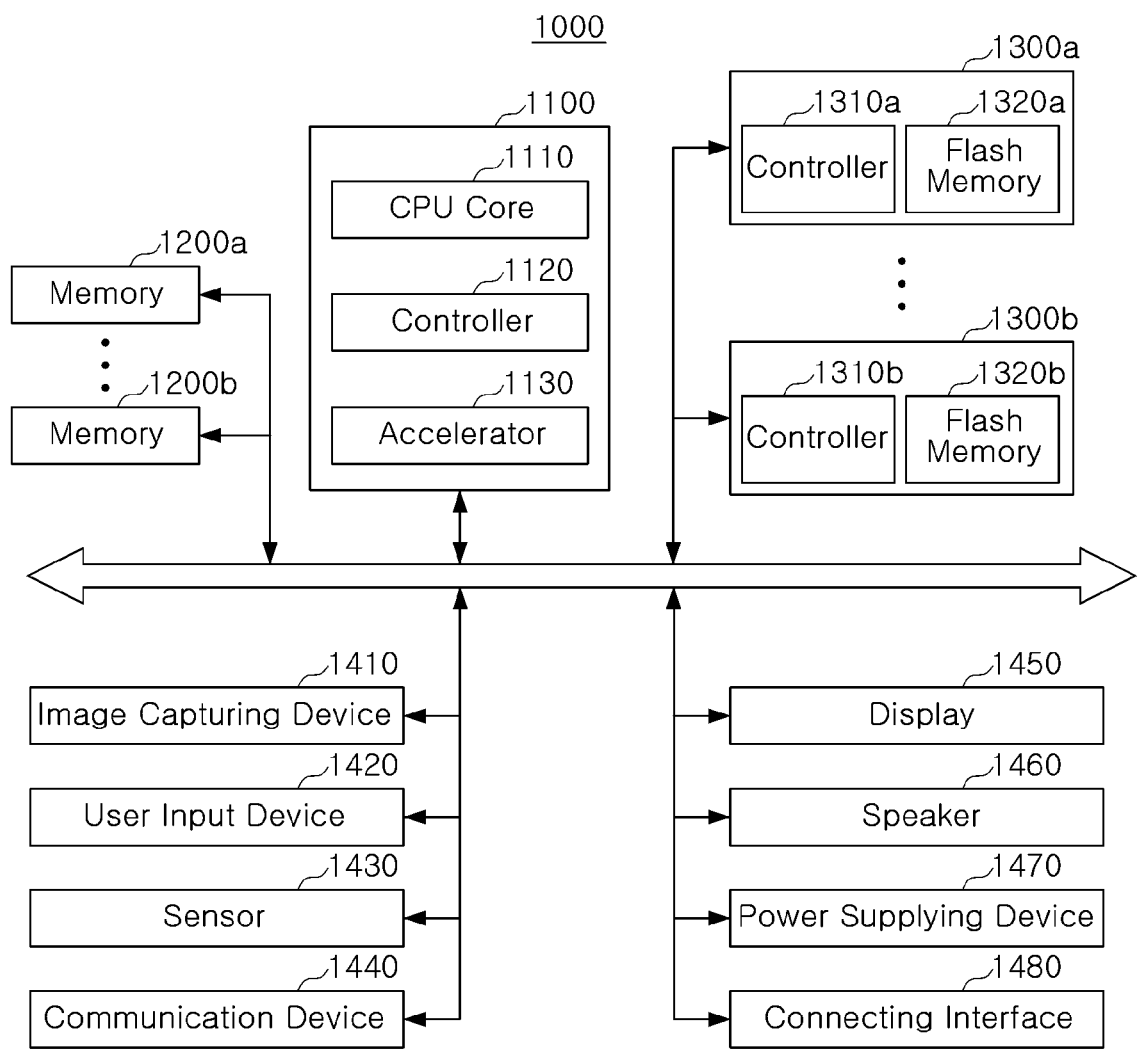
FIG. 20 is a diagram showing a system using the storage device according to example embodiments of the present inventive concept.

FIG. 20 is a diagram showing a system using the storage device according to example embodiments of the present inventive concept.

FIG. 20 is a diagram showing a system 1000 using the storage device according to example embodiments of the present inventive concept. The system 1000 shown in FIG. 20 may be a mobile system such as a mobile phone, a smartphone, a tablet personal computer (PC), a wearable device, a healthcare device or an internet of things (IOT)

device. However, the system 1000 shown in FIG. 20 is not necessarily limited to the mobile system, and may be a personal computer, a laptop computer, a server, a media player or an automotive device such as a navigation device.

Referring to FIG. 20, the system 1000 may include a main processor 1100, memories 1200*a* and 1200*b*, and storage devices 1300*a* and 1300*b*, and may further include at least one of an image capturing device 1410, a user input device 1420, a sensor 1430, a communication device 1440, a display 1450, a speaker 1460, a power supplying device 1470 and a connecting interface 1480.

The main processor 1100 may control an overall operation of the system 1000, for example, operations of other components included in the system 1000. The main processor 1100 may be implemented as a general-purpose processor, a dedicated processor, an application processor or the like.

The main processor 1100 may include at least one CPU core 1110, and may further include a controller 1120 for controlling the memories 1200*a* and 1200*b* and/or the storage devices 1300*a* and 1300*b*. According to example embodiments, the main processor 1100 may further include an accelerator 1130 which is a dedicated circuit for high-speed data operation such as an artificial intelligence (AI) data operation. The accelerator 1130 may include a graphics processing unit (GPU), a neural processing unit (NPU) and/or a data processing unit (DPU), and may be implemented as a separate chip physically independent from the other components of the main processor 1100.

The memories 1200*a* and 1200*b* may be used as main memory devices of the system 1000, include a volatile memory such as a shadow random access memory (SRAM) and/or a data random access memory (DRAM), and include the non-volatile memory such as the flash memory, the phase-change random access memory (PRAM) and/or a resistive random access memory (RRAM). The memories 1200*a* and 1200*b* may be implemented in the same package as the main processor 1100.

The storage devices 1300*a* and 1300*b* may function as non-volatile storage devices storing data regardless of whether power is supplied or not, and may have a relatively large storage capacity compared to the memories 1200*a* and 1200*b*. The storage devices 1300*a* and 1300*b* may include storage controllers 1310*a* and 1310*b* and non-volatile memories (NVM) 1320*a* and 1320*b* storing data under control of the storage controllers 1310*a* and 1310*b*. The non-volatile memory 1320*a* or 1320*b* may include a flash memory having a two-dimensional (2D) structure or a three-dimensional (3D)/vertical NAND (V-NAND) structure, and may include another type of non-volatile memory such as the phase-change random access memory (PRAM) and/or the resistive random access memory (RRAM).

The storage devices 1300*a* and 1300*b* may be included in the system 1000 by being physically separated from the main processor 1100, or may be implemented in the same package as the main processor 1100. In addition, the storage device 1300*a* or 1300*b* may have the same shape as the solid state device (SSD) or a memory card, and thus, be detachably coupled with the other components of the system 1000 through an interface such as the connecting interface 1480 described below. The storage device 1300*a* or 1300*b* may be a device to which a standard protocol such as the universal flash storage (UFS), the embedded multi-media card (eMMC) or the non-volatile memory express (NVMe) is applied, and may not be necessarily limited thereto.

The storage device 1300*a* or 1300*b* may drive the defense logic for maintaining the reliability of data stored therein. The storage device 1300*a* or 1300*b* may determine whether to drive the defense logic based on the data duration, which is the time interval until data is invalidated after the data is programmed therein, and drive the defense logic only when there is a high risk that the reliability of the data stored therein is deteriorated. Accordingly, it is possible to optimize the reliability and performance of the storage device 1300*a* or 1300*b*.

The storage device 1300*a* or 1300*b* may manage the statistical information on the data duration in the telemetry log and provide the telemetry log to the main processor 1100. The telemetry log provided to the main processor 1100 may be used to increase the usability and reliability of the storage device 1300*a* or 1300*b*. The storage device 1300*a* or 1300*b* may further increase the reliability and the performance thereof by adjusting a trigger condition of the defense logic by using the statistical information.

The image capturing device 1410 may capture a still image or a moving image, and may be a camera, a camcorder and/or a webcam.

The user input device 1420 may receive various types of data input from a user of the system 1000, and may be a touch pad, a keypad, a keyboard, a mouse and/or a microphone.

The sensor 1430 may detect various types of physical quantities which may be obtained from outside the electronic device 1000, and convert the detected physical quantities into an electrical signal. The sensor 1430 may be a temperature sensor, a pressure sensor, an illuminance sensor, a position sensor, an acceleration sensor, a biosensor, a gyroscope sensor or the like.

The communication device 1440 may transmit and receive a signal with other devices outside the system 1000 according to various communications protocols. The communication device 1440 may include an antenna, a transceiver and/or a modem.

The display 1450 and the speaker 1460 may respectively function as output devices for outputting visual and auditory information to the user of the system 1000.

The power supplying device 1470 may appropriately convert power supplied from a battery embedded in the system 1000 and/or an external power source, and supply the converted power to each component of the system 1000.

The connecting interface 1480 may connect the system 1000 with an external device connected to the system 1000 and may be capable of exchanging data with the system 1000. The connecting interface 1480 may be implemented using various interface methods such as an advanced technology attachment (ATA), a serial-ATA (SATA), an external SATA (e-SATA), a small computer small interface (SCSI), a serial attached SCSI (SAS), a peripheral component interconnection (PCI), a PCI-express (PCI-E), the non-volatile memory express (NVMe), IEEE 1394, a universal serial bus (USB), a secure digital (SD) card, a multi-media card (MMC), the embedded MMC (eMMC), the universal flash storage (UFS), an embedded universal flash storage (eUFS), a compact flash (CF) card interface or the like.

As set forth above, the storage device according to the example embodiments of the present inventive concept may reduce the number of times that unnecessary media scanning operations are performed, based on the duration of the data stored in the non-volatile memory.

The storage device according to the example embodiments of the present inventive concept may have the increased input/output performance and reliability by adjusting the criterion for triggering the media scanning operation by using the telemetry log of the non-volatile memory.

While example embodiments of the present inventive concept have been shown and described above, it will be apparent to those skilled in the art that modifications and variations could be made thereto without departing from the scope of the present inventive concept as set forth by the appended claims.

What is claimed is:

1. A storage device, comprising:
a memory device including a plurality of superblocks, wherein each superblock includes memory blocks included in a group of a plurality of non-volatile memories; and
a controller for controlling the memory device,
wherein the controller controls a first superblock to be erased to program data received from a host, controls the data to be programmed in the first superblock, controls the first superblock to be selected as a victim superblock for a garbage collection operation, and controls a media scanning operation to be performed on the memory device when a data duration is greater than a data duration threshold, wherein the data duration is an interval between a first time point, at which the first superblock is erased, and a second time point, at which the first superblock is selected as the victim superblock,
wherein the first superblock is one of the plurality of superblocks.

2. The storage device of claim 1, wherein the controller controls the media scanning operation to be performed by controlling the following operations to be performed on all target superblocks among the plurality of superblocks: an operation of reading target pages of the target superblock, an operation of detecting and correcting an error in data read from the target pages, and an operation of moving the error-corrected data to another superblock when the number of the detected errors is greater than or equal to an error bit threshold.

3. The storage device of claim 2, wherein the data duration threshold includes a first threshold and a second threshold greater than the first threshold,
the media scanning operation includes a first scan operation and a second scan operation, and
the controller controls the first scan operation to be performed when the data duration of the first superblock is greater than the first threshold and is less than or equal to the second threshold, and controls the second scan operation to be performed when the data duration of the first superblock is greater than the second threshold.

4. The storage device of claim 3, wherein the first scan operation includes an operation of reading N (here, N is a natural number) target pages from the target superblock, and
the second scan operation includes an operation of reading M (here, M is a natural number and more than N) target pages from the target superblock.

5. The storage device of claim 3, wherein the first scan operation includes an operation of selecting some superblocks from the plurality of superblocks as the target superblocks, and
the second scan operation includes an operation of selecting all of the plurality of superblocks as the target superblocks.

6. The storage device of claim 1, wherein the controller controls the media scanning operation to be skipped when the data duration of the first superblock is less than the data duration threshold.

7. The storage device of claim 1, wherein the controller controls an operation of programming all pages included in the first superblock to be completed by controlling dummy data to be programmed into an erased page when the erased page remains in the first superblock after a predetermined time elapses from the first time point.

8. The storage device of claim 1, wherein the controller controls the media scanning operation on the memory device to be further performed when the storage device is powered on.

9. The storage device of claim 1, wherein the controller controls statistical information to be updated based on the data duration of the first superblock when the first time point and second time point of the first superblock are included in a consecutive power-on period,
wherein the statistical information is information on the data duration of the plurality of superblocks.

10. The storage device of claim 1, wherein the controller controls a read count and an accumulated read time of the first superblock to be updated after reading the first superblock within the data duration of the first superblock, and
controls the media scanning operation on the memory device to be further performed based on the read count or the accumulated read time.

11. The storage device of claim 10, wherein the accumulated read time includes a total time in which unselected word lines connected to the first superblock are discharged due to the operation of reading the first superblock within the data duration of the first superblock.

12. A storage device, comprising:
a memory device including a plurality of non-volatile memories and a plurality of superblocks, wherein each superblock includes memory blocks included in a group of the plurality of non-volatile memories; and
a controller for controlling the memory device,
wherein the controller controls a superblock, which is selected from the plurality of superblocks, to be erased to program data received from a host, controls the data to be programmed in the erased superblock, and controls the superblock in which the data is programmed to be selected as a victim superblock for a garbage collection operation,
controls a telemetry log including statistical information about a data duration of the plurality of superblocks to be updated based on information about a data duration of a first superblock of the plurality of superblocks, wherein the data duration of the first superblock is an interval between a first time point at which the first superblock is erased, and a second time point, at which the first superblock is determined as the victim superblock, in one power-on period, and
controls a threshold of the data duration of the plurality of superblocks for triggering a media scanning operation on the memory device to be adjusted based on the telemetry log.

13. The storage device of claim 12, wherein the controller controls a weight to be assigned to the information about the data duration of the plurality of superblocks, based on information on temperatures of the non-volatile memories associated with the first superblock when the telemetry log is updated.

14. The storage device of claim 12, wherein the controller controls a weight to be assigned to the information about the data duration of the plurality of superblocks, based on a wearout degree of the first superblock when the telemetry log is updated.

15. The storage device of claim 12, wherein the controller controls the telemetry log to be provided to the host by using a non-volatile memory express (NVMe) interface protocol.

16. The storage device of claim 15, wherein the storage device is an open channel solid state drive (SSD), and
the controller controls the threshold to be adjusted based on control of the host receiving the telemetry log.

17. The storage device of claim 12, wherein the controller determines an average data duration, based on the statistical information about the data duration of the plurality of superblocks, controls the threshold to be adjusted downward when the average data duration is increased, and controls the media scanning operation to be performed when the data duration of a certain superblock is greater than the threshold.

18. The storage device of claim 12, wherein the controller determines an average data duration, based on the statistical information about the data duration of the plurality of superblocks, controls the threshold to be adjusted upward when the average data duration is reduced, and controls the media scanning operation to be performed when the data duration of a certain superblock is greater than the threshold.

19. The storage device of claim 12, wherein the controller controls the superblock in which the data is programmed to be selected as the victim superblock, based on a ratio of invalidated data of the superblock in which the data is programmed.

20. The storage device of claim 12, wherein the controller controls a storage space of the memory device to be divided into a plurality of namespaces, controls the namespaces to be provided to the host, controls the telemetry log for each of the plurality of namespaces to be updated, and controls a threshold of a data duration of the plurality of namespaces to be individually adjusted.

21. A storage device, comprising:
a memory device including a plurality of memory blocks; and
a controller for controlling the memory device,
wherein the controller controls a media scanning operation on the memory device to be performed when a certain memory block among the plurality of memory blocks is erased and a data duration, which corresponds to a time between when the memory block is erased and when the memory block is determined to be a candidate for a garbage operation, is greater than a threshold,
wherein the controller controls statistical information about the data duration of the plurality of memory blocks to be generated, and
wherein the controller controls a criterion for triggering the media scanning operation to be adjusted based on the statistical information.

\* \* \* \* \*